United States Patent [19]

Lieberman et al.

[11] Patent Number: 5,781,918
[45] Date of Patent: Jul. 14, 1998

[54] MEMORY SYSTEM AND METHOD FOR SELECTING A DIFFERENT NUMBER OF DATA CHANNELS DEPENDING ON BUS SIZE

[75] Inventors: Donald A. Lieberman, San Jose; John J. Nemec, Santa Clara, both of Calif.

[73] Assignee: Cypress Semiconductor Corp., San Jose, Calif.

[21] Appl. No.: 758,218

[22] Filed: Nov. 27, 1996

Related U.S. Application Data

[62] Division of Ser. No. 539,305, Oct. 3, 1995, abandoned, which is a continuation of Ser. No. 229,357, Apr. 18, 1994, abandoned, which is a division of Ser. No. 747,202, Aug. 16, 1991, abandoned.

[51] Int. Cl.$^6$ ............... G06F 12/00; G06F 12/04; G06F 13/00; G06F 13/40
[52] U.S. Cl. ............... 711/5; 711/105; 711/171; 711/172; 395/307; 395/308; 395/886; 371/40.1
[58] Field of Search ............... 395/405, 431, 395/432, 438, 494, 497.02, 497.03, 280, 306, 307, 308, 885, 886; 711/5, 104, 105, 111, 167, 171, 172; 371/40.1, 40.2

[56] References Cited

U.S. PATENT DOCUMENTS

| | | | |
|---|---|---|---|
| 4,195,340 | 3/1980 | Joyce | 211/133 |
| 4,245,307 | 1/1981 | Kapeghian et al. | 395/287 |
| 4,476,527 | 10/1984 | Clayton, IV | 395/849 |
| 4,494,190 | 1/1985 | Peters | 395/308 |
| 4,571,674 | 2/1986 | Hartung | 711/114 |
| 4,633,434 | 12/1986 | Scheuneman | 395/551 |
| 4,633,437 | 12/1986 | Mothersole et al. | 395/894 |
| 4,675,808 | 6/1987 | Grinn et al. | 711/211 |
| 4,683,534 | 7/1987 | Tietjen et al. | 395/307 |
| 4,751,671 | 6/1988 | Babetski et al. | 395/876 |
| 4,814,980 | 3/1989 | Peterson et al. | 395/200 |
| 4,853,846 | 8/1989 | Johnson et al. | 395/381 |
| 4,935,894 | 6/1990 | Ternes et al. | 395/308 |
| 4,954,951 | 9/1990 | Hyatt | 711/218 |
| 5,056,041 | 10/1991 | Guttag et al. | 345/521 |
| 5,077,686 | 12/1991 | Rubinstein | 395/556 |
| 5,079,693 | 1/1992 | Miller | 395/250 |
| 5,115,503 | 5/1992 | Durkin | 395/556 |
| 5,131,083 | 7/1992 | Crawford et al. | 395/849 |
| 5,333,294 | 7/1994 | Schnell | 395/846 |
| 5,469,558 | 11/1995 | Lieberman et al. | 395/285 |

OTHER PUBLICATIONS

Brian Case, "MBus Provides Processor–Independent Bus: Initially a Module Interface, Direct Interface for Future Processors", *Microprocessor Report*, pp. 8–12, Aug. 7, 1991.

Programmabale Memory Controller, *IBM Tecnical Disclosure Bulletin*, pp. 351–354, 1989.

*Primary Examiner*—Glenn Gossage
*Attorney, Agent, or Firm*—Blakely, Sokoloff, Taylor & Zafman LLP

[57] ABSTRACT

A memory system includes a main memory and a memory controller, the main memory including at least one block which has a plurality of banks. The memory controller includes a plurality of data channels each of which can access at least one bank in the main memory. Each data channel comprises a write first-in-first-out (FIFO) buffer for efficiently supporting cache purge operations and normal write operations, and a reflective write FIFO buffer for efficiently supporting coherent read with simultaneous cache copyback operations. The memory controller selects the proper FIFO or FIFOs depending on the type of data transaction, and selects the proper channel or channels depending on the system bus size, the data transaction size, and the status of cache FIFO(s). The memory system can efficiently support data transactions having different data lengths or sizes from a byte to a long burst. The memory system can support different bus and processor systems and different data transactions in a highly efficient manner.

16 Claims, 7 Drawing Sheets

MEMORY SYSTEM AND METHOD FOR SELECTING A DIFFERENT NUMBER OF DATA CHANNELS DEPENDING ON BUS SIZE

This Application is a Divisional of U.S. patent application Ser. No. 08/539,305, filed Oct. 3, 1995, now abandoned, which is a Continuation of U.S. patent application Ser. No. 08/229,357, filed Apr. 18, 1994, now abandoned, which is a Divisional of U.S. patent application Ser. No. 07/747,202, filed Aug. 16, 1991 and later abandoned in favor of U.S. patent application Ser. No. 08/228,927, filed Apr. 18, 1994, now U.S. Pat. No. 5,469,558.

FIELD OF THE INVENTION

The present invention is related to a memory system, and more particularly to a memory system which can be coupled with different buses to efficiently support both single and multi-processor architectures.

BACKGROUND OF THE INVENTION

With the wide use and rapid development of random access memories ("RAM"), especially dynamic random access memories ("DRAM"), the storage capacity of memory devices doubles approximately every two years. In addition, different types of memory devices, such as DRAMS with different storage capacities, are now available in the market. They include DRAMS of sizes 256k×1, 1M×1, 4M×1, 16M×1, 256k×4, 1M×4, 4M×4, and soon will include wider DRAMS with storage capacity of 256k×16 and 1M×16. However, the questions of how to provide a main memory structure which can efficiently support different processor and bus systems, and allow the use of different types of memory devices, have not yet been solved by the prior art. Further, if such a main memory is provided, the next issue is providing a memory controller which can efficiently control the access to such memory in accordance with different processor system requirements.

In order to satisfy different processor system requirements, a variety of different system buses have been introduced having different bandwidths to support different processors. These buses may also have different bus clock frequencies.

One bus available on the market is a bus called MBus, developed by Sun Microsystems Inc. (Mountainview, Calif.), which is compatible with complementary metal-oxide semiconductor (CMOS) technology. The MBus is normally classified into two levels. Level 1 supports a single processor system. An example of a uniprocessor system is generally shown in FIG. 1A, in which bus 2 is coupled between processor 3 and memory controller 4, the latter connected to memory 5. Another example of a uniprocessor system is shown in FIG. 1B, wherein the processor 6 is coupled to a cache 7 which is further coupled to a system bus 8. Level 2 supports multi-processor systems. An example of a multi-processor system 10 is shown in FIG. 1C. A plurality of processors 11-12 (only two are shown) share common main memory 17 through bus 15 and memory controller 16, with each processor 11 or 12 associated with at least one local cache 13 or 14. An example of the level 2 MBus is the SPARC® MBus Level 2 which can support normal read and write transactions plus a number of additional transactions including coherent invalidate transactions, coherent read transactions, coherent write and invalidate transactions, and coherent read and invalidate transactions. SPARC® is a registered trademark of SPARC International, Menlo Park, Calif. Each of these latter transactions requires that a local cache be associated with each processor. Although the SPARC MBus is defined currently with a 64 bit system bus operating at 40 MHz, system buses may have different bus sizes, such as 32-, 64- and 128-bit data widths, and different clock frequencies, such as 25 MHz, 33 MHz, 40 MHz, or 50 MHz.

Conventional memory systems are not flexible enough to support a variety of buses which each have different bus sizes and clock rates. In particular, conventional memory systems do not efficiently support bus systems which are coupled to a number of processors, each of which is associated with at least one local cache, and which share a common main memory.

For example, in some processor systems, cache controllers in copyback environments may not have internal buffering allowing them to purge the cache line internally, and then request a read of the main memory (a DRAM), followed by a write of the old cache line back to the main memory. They frequently are required to perform the write to main memory first, followed by the read. This wastes processor cycle time waiting for the missed cache line to be filled. Conventional memory systems have no mechanism to support a cache purge operation. In addition, during a coherent read transaction, conventional memory controllers can only monitor the transaction without being able to convert the inhibited read operation to write operation, thereby implementing a reflective memory.

Some conventional memory controllers are provided with a data buffering device, such a FIFO, to buffer normal write or read data. However, the configuration of such controllers are generally not suitable for support of the above mentioned cache purge or reflective read operations. Further, such controllers cannot efficiently perform a data transaction between main memory and the system bus when the data buffering device is occupied by a previous transaction. In addition, short byte and long burst transactions normally cannot be performed in an efficient and reliable manner.

Finally, conventional memory systems are not flexible enough to enhance the timing resolution of the memory in accordance with different system bus clock frequencies.

Examples of these conventional memory systems are disclosed in the following references: U.S. Pat. No. 4,954,951 issued on Sep. 4, 1990; a product specification of Advanced Micro Devices titled "4M Configurable Dynamic Memory Controller/Driver", product No. AM29C668, published in March, 1990; a product specification of Samsung titled "Dynamic RAM Controllers", product No. KS84C31/32, published in November, 1989; a product specification of Signetics titled "Intelligent DRAM Controller", product No. FAST 74F1763, published on May 12, 1989; a product specification of Signetics titled "DRAM and Interrupt Vector Controller", product No. FAST 74F1761, published on May 5, 1989; and an article by Brian Case titled "M-Bus Provides Processor—Independent Bus", published in Microprocessor Report on Aug. 7, 1991 (pp. 8–12).

SUMMARY OF THE INVENTION

Thus, it is an objective of the present invention to provide a memory system which has the flexibility for use with different types of system buses which may have different bus sizes and clock frequencies.

It is another objective of the present invention to provide a memory system which has a novel memory structure for supporting different processors and bus systems. The memory structure includes a plurality of blocks, each of which can be configured with a different type of memory chip which can be of different sizes and configurations.

It is yet another objective of the present invention to provide a memory system which can efficiently support all MBus Level 1 and Level 2 transaction types, cache purge operations and a coherent read with simultaneous copyback operation.

It is still another objective of the present invention to provide a memory system which can support 32-, 64- and 128-bit wide system buses, including additional bits for parity generation and checking for data, parity checking on the address, and additional control bits for increased flexibility in supporting multiple processors.

It is still another objective of the present invention to provide a memory system which can be coupled to different types of system buses having different bus clock frequencies, and which provides enhanced memory timing resolution.

It is still another objective of the present invention to provide a memory system which provides a plurality of data channels to allow efficient data transactions.

It is still another objective of the present invention to provide a memory system which supports a memory subdivided into a plurality of blocks and provides efficient access to the one or more banks which comprise each one of the plurality of blocks, depending on bus and data sizes.

It is still further an objective of the present invention to provide a DRAM controller which can reduce system bus traffic and enhance the efficiency of multiple processors which share a common main memory.

In accordance with the objectives of the present invention, a high-performance dynamic memory system is provided having a main memory and a memory controller coupled between a system bus and the main memory.

The main memory includes at least one block which includes a plurality of banks. Each of the banks has a predetermined memory bandwidth. Each block of the main memory is constructed of one or more DRAM-type memory circuits.

The system bus can have different bus sizes and different bus frequencies. The system bus is coupled to a plurality of processors, each of which is associated with at least one local cache so that the main memory is shared by all of the processors. In a first embodiment of the invention, the system bus is an extended MBus which can support different processor systems.

The memory controller includes control circuitry to receive address and control signals from the system bus to control transfer of data to main memory from the system bus, and to the system bus from main memory. The controller also includes data sending and receiving circuitry to send data to and receive data from the system bus, and to send data to and receive data from the main memory, again under control of the control circuitry.

The control circuitry includes an address signal path and a control signal path. On the address signal path, the control circuitry is provided with a read address path and a write address path. The write address path is further provided with two write paths. One is used for providing a path for the first data transaction address when consecutive write data transactions occur on the system bus. The other is used for holding the subsequent data transaction address while the first data transaction is completed in the DRAM. On the control signal path, the control circuitry is provided with a read control signal path and a write control signal path. The write control signal path further includes a first path for a first data transaction control signal and a second path for holding the subsequent data transaction control signal.

The control circuitry is configured to provide program information with respect to the structural parameters of main memory, system bus sizes, and system bus frequency multiplication factors, to support different memory types in main memory, different types of system buses which have different bus sizes and bus speeds, and to enhance the timing resolution of main memory.

The data sending and receiving circuitry includes a plurality of data channels, each of which includes a write data path on which there is at least one write first-in-first-out device (write FIFO). The write FIFO temporarily maintain data received from the system bus to be stored into main memory, and allows any of the processors to obtain data from the memory at any time without loss of the data previously stored in the FIFOs. Also on the write data path, there is at least one reflective first-in-first-out device (reflective FIFO) used to capture a copy of data on the system bus which is being transferred from a local cache associated with one of the processors, to a local cache of another data requesting processor, such that the data is simultaneously stored in the reflective FIFO and in the local cache of the data requesting processor. Each channel has a predetermined data bus bandwidth which is equal to or greater than that of a bank in a block of main memory.

Each data channel also includes a read data path for transfer of read data between the system bus and main memory. An error detection and correction circuit is provided on the read data path which is used to support the correcting of data.

In a second embodiment, two data channels are combined into a single data channel unit in the form of an integrated circuit. A data sending and receiving circuit can include two or more of these data channel units.

The control circuitry of the memory controller also includes control logic which can identify and select the proper data channels and channel units. This selection depends on the system bus size, the status of each data channel, and the data sizes to be transferred. During the write of a data burst, the channels in each unit can operate in an alternating fashion, so that more data words within the main memory boundary can be accumulated in the proper channels for efficient transfer into main memory.

In a third embodiment, main memory is structured as a plurality of blocks each of which can be configured with a different DRAM type. Each block includes a plurality of banks each populated with an identical DRAM type.

The main memory system also includes a frequency multiplier for multiplying the bus frequency to provide a memory clock for enhancing the main memory timing resolution. The frequency multiplier uses a bus frequency multiplication factor produced by the programmable memory controller.

In a fourth embodiment, the programmable memory controller includes a number of program registers which store programming functions. Among these program registers, there is a command register which stores a variety of information for control purposes, including the number of blocks in main memory, and each block's size and its location in the processor's memory maps, the bus size, the bus frequency multiplication factor and the data bandwidth of the error detection and correction circuit. A timing register is provided to store the timing of control signals for the main memory read and write operations with an enhanced timing resolution. The memory controller also includes a status register to store the status of each data channel, such as the status of each FIFO (empty or not empty) on each data channel and the error information occurring during data transactions. There is also a location program register supplied to store information describing the location of the blocks of main memory in the overall memory map, which is connected to a comparator to allow correct selection of one of the blocks in the memory when an incoming address matches one of the programmed locations in the location program register. Associated with the location program register, there is a mask register for storing mask bits used to identify which processor's address bits should participate in the address match.

The features and advantages of the present invention, including those mentioned above and others not yet mentioned, will become apparent after studying the following detailed description of the embodiments with reference to the following drawings.

DETAILED DESCRIPTION OF THE PREFERRED EMBODIMENTS

The following descriptions are directed to embodiments of a memory system constructed in accordance with the present invention.

Figure 1A:
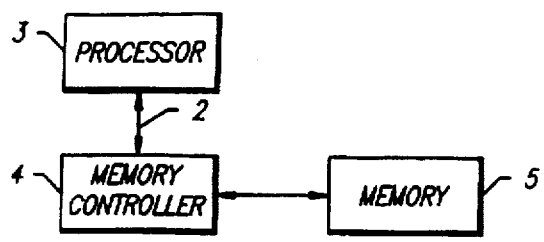
FIG. 1A shows an example of a uniprocessor system.
Figure 1B:
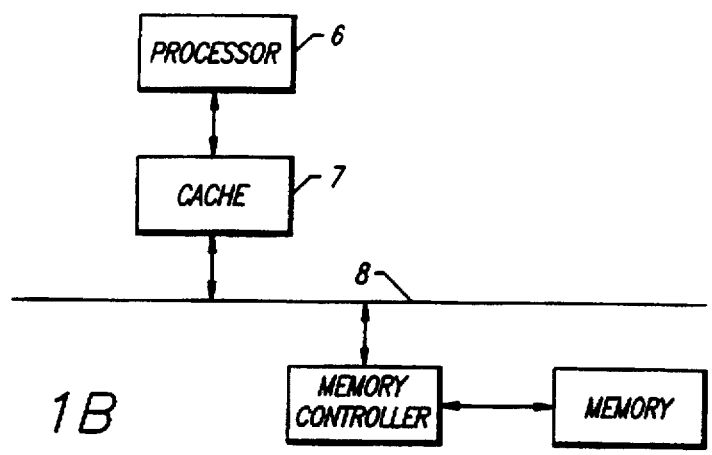
FIG. 1B shows another example of a uniprocessor system.
Figure 1C:
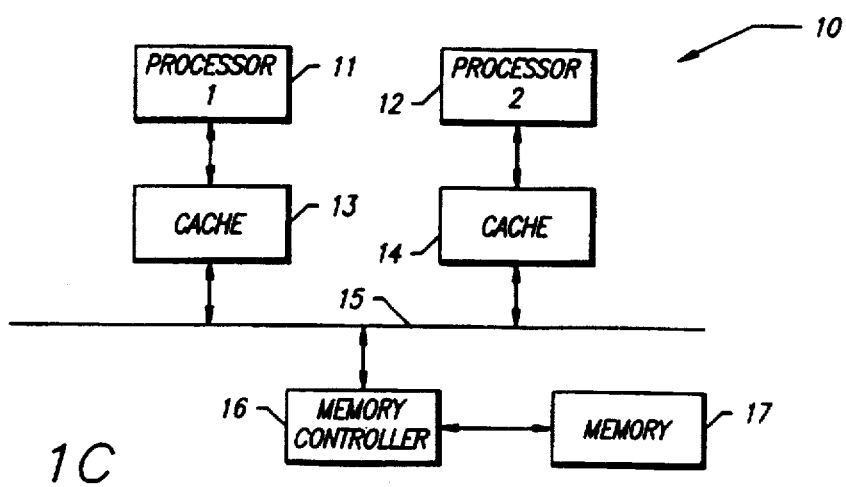
FIG. 1C generally shows a multi-processor system in which the cache is used.

The memory system includes a DRAM structure and a unique DRAM controller which is suitable to support a large memory structure having buses of different size (e.g. 32-, 64- or 128-bit data widths), and also having different bus clock frequencies (e.g. 25 MHz, 33 MHz, 40 MHz or 50 MHz). The memory system is also suited to support a number of bus transactions, thus providing high-performance and high-efficiency memory services to different processor systems. Such processor systems include single processor systems as shown in FIGS. 1A and 1B, and multi-processor systems as shown in FIG. 1C. The DRAM controller includes a DRAM control device (DRAC) (FIG. 3) and a data sending and receiving device (DSRD) (FIG. 4). The DRAC is coupled to the DSRD, and between the system bus and the DRAM. The DSRD is coupled between the system bus and the DRAM. The system bus can be either a single multiplexed address/data bus or contain separate address and data buses. The bus interface is fully synchronous and uses the rising edge of the bus clock. Bus signal definitions are an extension of the MBus standard, so that an MBus can be used to support additional processor systems.

The memory system of the present invention consists of a high-performance address/control path and at least one high performance error detecting and correcting data path. On the address/control path, the memory controller is provided with a programmable DRAC for efficiently controlling memory accesses for a number of bus systems and data transactions. On the data path, the memory controller is provided with a DSRD which includes FIFO buffers and an error detection and correction circuit (EDC). The DSRD serves as a high-performance data buffer and demultiplexer on writes and as an error corrector on reads. The DRAC and DSRD can be respectively made into integrated circuits.

1. MEMORY STRUCTURE

Figure 2:
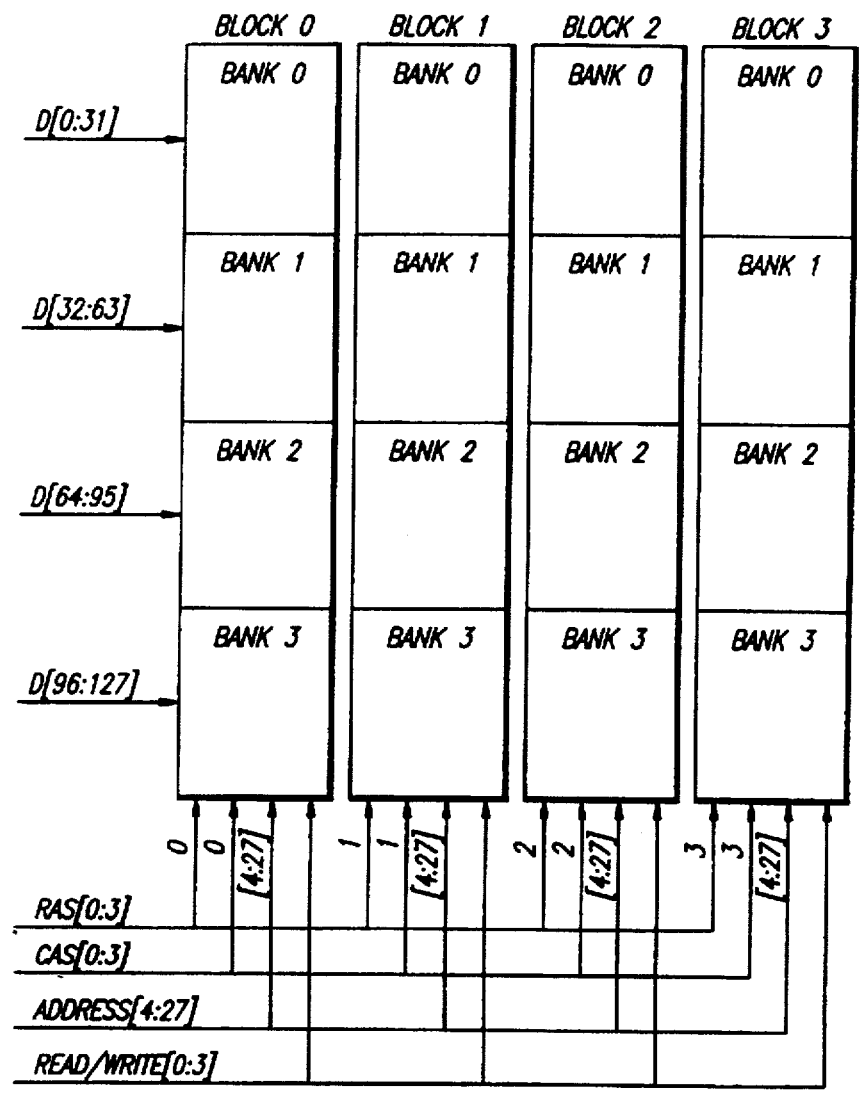
FIG. 2 shows an embodiment of a main memory structure constructed in accordance with the present invention.

Referring now to FIG. 2, an embodiment of a memory structure constructed in accordance with the present invention is shown. The memory of FIG. 2 is constructed using a plurality of DRAM chips.

The memory of FIG. 2 is organized into 4 blocks (blocks 0–3). Each block consists of 4 banks (banks 0–3). Each bank is 39 bits wide (i.e. 32 data bits and 7 error check bits). Banks 0–3 can be accessed simultaneously as a 156-bit wide block, to achieve maximum memory performance.

The memory has 12 address lines (multiplexed as row and column addresses) connected to the memory side of the memory controller. Each one of the blocks of the main memory is coupled to four DRAM Read/Write [3:0] lines, one of four Row Access Strobe control lines RAS [3:0] and one of four Column Access Strobe control lines CAS [3:0]. The memory is written u sing the early write cycle, i.e. DRAM chips having common input/output (I/O) will be controlled in the same manner as the DRAM chips having separate I/O. External buffers are required to drive the substantial address and control capacitance that exists when using DRAMS in such large configurations.

The memory controller chip set (DSRD and DRAC) is designed to support either 256K×1 or 4, 1M×1 or 4, or 4M×1 or 4 and 16M×1 DRAM chips. The controller will also support wider 4 Mbit DRAMS (256K×16) and wider 16 Mbit DRAMS (1M×16) when these devices become available. The maximum total capacity of the memory system can be extended from four Mbytes using 256K×1 DRAMS and populating a single block, up to 1 Gbyte using 16M×1 DRAMS and populating all four blocks. Storage capacity is expandable in binary increments. DRAM chip types remain identical within all four banks comprising a block, however, each block may be populated with a different type of DRAM. The possible configurations of the DRAM structure are given below in Table 1. A multiple frequency clock (2× a 40 or 50 MHz bus clock, 3× a 33 MHz bus clock, or 4×a 25 MHz bus clock) input is provided to control DRAM timing to 10 ns intervals (12.5 ns. for 40 MHz bus clocks).

Each 156-bit block has its data lines connected to the respective data lines of the other blocks. The appropriate block is selected by asserting its RAS and CAS lines. The 156 bits emerging from the selected block will be steered through the DSRD where the data will be checked and corrected if necessary. The error check bits are removed and the data is placed on the bus. The memory can support 32-, 64- or 128-bit wide data paths.

TABLE 1

| DRAM TYPE | DRAM BANK | DRAM BLOCK | CAPACITY PER BLOCK MBYTES | NUMBER OF BLOCKS | CAPACITY PER SYSTEM MBYTES |
|---|---|---|---|---|---|
| 256K X 1 | 256K X 39 | 4 X 256K X 39 | 4 | 1-4 | 4-16 |
| 1M X 1 | 1M X 39 | 4 X 1M X 39 | 16 | 1-4 | 16-64 |
| 4M X 1 | 4M X 39 | 4 X 4M X 39 | 64 | 1-4 | 64-256 |
| 16M X 1 | 16M X 39 | 4 X 16M X 39 | 256 | 1-4 | 256-1024 |
| 256K X 4 | 256K X 40 | 4 X 256K X 40 | 4 | 1-4 | 4-16 |
| 1M X 4 | 1M X 40 | 4 X 1M X 40 | 16 | 1-4 | 16-64 |
| 4M X 4 | 4M X 40 | 4 X 4M X 40 | 64 | 1-4 | 64-256 |

It should be understood that each bank in a block of the main memory can also be configured with other predetermined data widths, such as with 64 data bits.

2. BUS STRUCTURE AND DEFINITION

The system bus can comprise different buses, including the MBus which is currently available on the market. In accordance with the present invention, the bus signal specification may be reorganized and extended in order to efficiently support multiple processor systems. In one embodiment, a signal specification is provided for support of existing 32-, 64-, and 128-bit data buses, with additional bits for data parity generation and checking, address parity checking, and control bits for supporting different processor systems. Separate address and data lines can be provided to support non-multiplexed system bus applications. The signals can also be multiplexed to support MBus compatibility. The signal specification in cooperation with the memory system of the present invention, not only supports all MBus Level 1 and Level 2 transaction types including bursts, but also allows premature termination of burst transactions, provides support of various burst orders (sequential and Intel style bursts), provides support of different processor's burst length requirements (Intel, Motorola, Sparc), and allows write posting of cache data lines into a FIFO. Additionally, read/write or I/O operations can be inhibited to allow conversion of data transactions, such as from read to write or from write to read, so as to enhance bus transaction speed.

The control signals transferred through the system bus, as an example, can include address signals (AD), address strobe signals (AS*) to identify the address phase, data strobe signals (DS*) for identifying the data phase, address/data parity signals (ADP), and data burst last signals (BLST) for premature termination of bus transactions. An asterisk (*) following a signal name indicates that the signal is active low. The control signals can further include interface mode signals (IMD) for identifying bus interface mode, transaction type signals (TYPE) for specifying transaction type, transaction size signals (SIZE) for specifying the number of bytes to be transferred during a bus transaction, and memory inhibit signals (INH) for aborting a DRAM read/write or I/O cycle already in progress. Other control signals can include transform cycle signals (TRC) for transforming an inhibited transaction cycle into another, snoop window signals (SNW) for extending the snoop window beyond the timing interval programmed in a timing register, bus acknowledge signals (BACK) for supplying the transaction acknowledge to the bus master, bus error signals (BERR) for indicating a bus error occurrence, and bus request signals (BR) issued by the DRAC to hold ownership of the bus during reflective read transactions. Still other control signals include bus busy signals (BB) asserted by DRAC 8 for the duration of its bus ownership, bus grant signals (BG), and interrupt out signals (INT) asserted whenever an error condition occurs. Finally, the control signals can include clock signals (CLK) for synchronizing all bus transactions, multiple frequency clock signals (MCLK) for generating enhanced DRAM timing resolution, reset-in signals (RSTIN) for resetting DRAM, and identification signals (ID).

The following describes some of these control signals in more detail.

IMD is used to specify the bus type or bus mode which is currently coupled to the main memory system, such as MBus mode or a generic bus mode.

TYPE specifies the data transaction type during the address phase. The interpretation of the TYPE bits is determined by IMD. For example, when IMD indicates that the bus type is SPARC® type, the TYPE bits identify all the data transaction types of the SPARC MBus, which include write, read, coherent invalidate, coherent read, coherent write and invalidate, and coherent read and invalidate. When IMD indicates that the bus type is a generic type, the TYPE bits identify various data transaction types of either MBus or generic applications, which include write, read, read-in-default burst size, write, write-in-default burst size, sequential burst order, non-sequential burst order (such as Intel processors), posted write, posted write in default burst size, position of byte 0 on the bus. Byte 0 appears as either the lowest byte on the bus or as the highest byte on the bus.

SIZE bits are used to specify the transaction size and the particular byte or bytes to be enabled. The available transaction sizes may include a byte, a halfword (2 bytes), a word, double words, 16-byte burst, 32-byte burst, 64-byte burst, or a 128-byte burst. The particular byte enable information is added to the original MBus specification to provide byte enable and misaligned data transfers compatible with processors such as the i486 and 68040. Any combination of byte enables may be asserted simultaneously. Interpretation of transaction size information is a function of a particular one or more bytes' addresses in an address signal, which allows, for example, selection of one or more data channels in the memory controller, or to access one or more bytes in a bank in main memory, or to access one or more banks in main memory.

PMD bits specify the parity computation algorithm and identify those signals that participate in the parity computation. PMD bits are valid during the entire system bus cycle. The parity modes include parity computation disabled, address parity computed, data parity computed, address and data parity computed, odd parity computed, or even parity computed.

BACK bits supply a transaction acknowledge signal to the master system processor (i.e. the bus master). In the MBus mode, the acknowledge signal includes MBus definitions, such as uncorrectable error, valid data transfer, and idle cycle. In the generic mode, the acknowledge signal may include valid data transfer, error exception, and idle cycle.

AS* is asserted by the bus master to identify the address phase of the transaction.

DS* is asserted by the bus master during the data phase of a transaction. DS is internally pipelined in the DRAC and appears one clock cycle before the clock cycle in which the data is transferred. Data is transferred and BACK is asserted during every system bus cycle after the clock cycle in which DS is asserted (provided that the DRAM controller can acknowledge a transfer). The bus master may use DS to control (suspend) the slave's response on a cycle-by-cycle basis.

BLST is used by the bus master to prematurely terminate bus transactions. BLST is only recognized during clock cycles in which DS is also asserted. Therefore BLST should be asserted one system bus cycle before the last desired data transfer.

INH is asserted by a cache controller in multi-processing environments to abort a DRAM read/write or register I/O cycle already in progress. When INH is received before the data transfer begins, the operation is terminated before any data is transferred. When INH is received after the memory controller has begun to issue bus acknowledges, it is ignored. When the memory is reflective, the read of DRAM is converted into a write. The BACK signal, now originating from the snooping cache that owns the data, is interpreted to provide a write strobe to the FIFO/EDC data path. Inhibited writes may also be converted to reads for ownership.

TRC, when asserted, transforms an inhibited read cycle into a write cycle (reflective) or an inhibited write cycle into a read cycle (read for ownership).

SNW, when asserted, extends the snoop window beyond the interval that results from the values programmed into the DRAM timing register. This signal can be permanently de-asserted if it is not used.

BERR indicates that a bus parity error has occurred during the address or data phase of a data transaction. The signal is asserted asynchronously (i.e. one or more clocks late). This signal is valid one clock cycle after the error occurs and lasts until cleared. The signal is cleared by writing an appropriate bit to the Command Register.

BR is issued by the DRAC during reflective-read transactions. BR issued by the main memory system is interpreted as the highest priority request for ownership to the system's bus arbitration logic. Additional system bus transactions are suspended until the ongoing write (resulting from the reflective-read) to main memory is complete. The original MBus specification has no explicit mechanism for a reflective main memory to postpone the next bus transaction while the data being transferred between two caches is simultaneously written to DRAM. Systems having more elaborate protocols for acknowledging data transfers between a requesting cache and a cache data owner can use BR to create a data strobe to prevent the next transaction from overwriting the reflective data path inside the DSRD.

BG is asserted by external arbitration logic in response to a BR to indicate that the DRAC has been granted ownership of the bus.

BB is asserted by the DRAC for the duration of its bus ownership. The DRAC will acquire the bus as it completes the main memory write transaction during reflective read operations.

INT is an output which is asserted (if enabled) whenever an error condition occurs. For example, system bus parity errors or memory errors can cause INT to be asserted.

CLK synchronizes all bus data transactions. For example, the maximum clock frequency is 50 MHz and all data transactions are strobed in at the rising edge of the clock signal.

RSTIN is used to reset the DRAC. The signal must be asserted for at least four clocks.

ID bits have two interpretations. When IMD indicates MBus mode, ID bits interpretation is strictly MBus compatible. In MBus mode, the ID field selects various configuration spaces within the MBus address space for access to the port register and other I/O registers. When used in non-MBus modes, the ID bits are used in conjunction with address signals to define the nature of the bus transaction and select I/O registers or DRAM memory. A match is required between the ID bits and the fixed values for defined generic (non MBus) operations.

In a second embodiment, the system bus specification is an extension of the MBus standard (called EM-Bus) which can support more processor systems including SPARC, i860, i486, and Motorola 68040, 88000 series and MIPS R3000 and R4500 series. In EM-Bus, some of the MBus signals are reserved, some of the MBus signals are redefined and enhanced, and some new signals are added.

All EM-Bus transactions are split into an address phase followed by a data phase. The address phase is identified by the assertion of the Address Strobe signal (AS*) and lasts for one EM-Bus cycle. The data phase immediately follows the address phase and may last for one or more clock cycles. The data phase is identified by the Bus Master's assertion of Data Strobe (DS*) and simultaneous de-assertion of AS*. The Bus Master may temporarily interrupt data transactions by deasserting DS*. DS* may be permanently asserted for systems that do not require its use. The EM-Bus extension allows multiplexed address and data buses, however they are not mandatory as in MBus. When multiplexing to create AD[0:63], as in MBus, the address (and attributes that form AD[36:63]) will be asserted simultaneously with AS* and the data will be asserted simultaneously with DS*.

TABLE 2

| SIGNAL | DESCRIPTION | SOURCE | TYPE | EXT | DRC |
|---|---|---|---|---|---|
| A[0:35] | ADDRESS | MASTER | TRI-STATE | R | X |
| AP[0:3] | ADDRESS PARITY | MASTER | TRI-STATE | X | |
| D[0–63] | DATA | MASTER/SLAVE | TRI-STATE | R | X |
| D[64–127] | DATA | MASTER/SLAVE | TRI-STATE | X | O |
| DP[0:15] | DATA PARITY | MASTER/SLAVE | TRI-STATE | X | O |
| TYPE[0:5] | TRANSACTION TYPE | MASTER | TRI-STATE | R | X |
| SIZE[0:7] | TRANSACTION SIZE | MASTER | TRI-STATE | R | X |
| C | DATA CACHEABLE | MASTER | TRI-STATE | DM | |
| LOCK | BUS LOCK INDICATOR | MASTER | TRI-STATE | DM | |
| MBL | BOOT MODE/LOCAL BUS | MASTER | TRI-STATE | DM | |
| VA[12:19] | VIRTUAL ADDRESS | MASTER | TRI-STATE | DM | |
| RESERVED | FOR FUTURE EXPANSION | MASTER | TRI-STATE | DM | |
| SUP | SUPERVISOR ACCESS INDICATOR | MASTER | TRI-STATE | DM | |

TABLE 2-continued

| SIGNAL | DESCRIPTION | SOURCE | TYPE | EXT | DRC |
|---|---|---|---|---|---|
| MID[0:3] | MODULE INDENTIFIER | MASTER | TRI-STATE | DM | |
| IMD | INTERFACE MODE | MASTER | TRI-STATE | X | X |
| PMD[0:2] | PARITY MODE | MASTER | TRI-STATE | X | O |
| AS* | ADDRESS STROBE | MASTER | TRI-STATE | | X |
| DS* | DATA STROBE | MASTER | TRI-STATE | X | O |
| BLST* | BURSTLAST | MASTER | TRI-STATE | X | O |
| SH* | SHARED | BUS WTCHR | OPENDRAIN | | |
| INH* | MEMORY INHIBIT | MASTER | TRI-STATE | | O |
| SNW* | SNOOP WINDOW | BUS WTCHR | TRI-STATE | X | O |
| TRC* | TRANSFORM CYCLE | MASTER | TRI-STATE | X | O |
| RSTIN* | RESET IN | RST LOGIC | BI-STATE | | X |
| RSTOUT* | RESET OUT | ANYONE | BI-STATE | | |
| BACK[0:2]* | BUS ACKNOWLEDGE | SLAVE | TRI-STATE | | X |
| BERR* | BUS ERROR | ANYONE | OPENDRAIN | | O |
| BR* | BUS REQUEST | MASTER | BI-STATE | | O |
| RG* | BUS GRANT | ARBITER | BI-STATE | | O |
| BB* | BUS BUSY | MASTER | TRI-STATE | | O |
| CLK | CLK | CLK BUFFER | BI-STATE | | X |
| IRL[0:3] | INTERRUPT LEVEL | INT LOGIC | BI-STATE | | |
| ID[0:3] | MODULE IDENTIFIER | SYSTEM | BI-STATE | | O |

The signals marked with an X in the EXT column are present in the EM-Bus specification, but not the MBus specification. The signals marked with an R (Redefined) are described in MBus, but redefined and enhanced in this EM-Bus specification. Those signals marked with a DM (De-Multiplexed) have identical functional definitions as in MBus, however they need not be multiplexed with the data lines in EM-Bus. The signals marked with an X in the DRC column are all required inputs to the DRAM Controller chip set. Those marked with an O in the DRC column are options that may be required in various subsystems of the memory system. An asterisk (*) following a signal name indicates that the signal is active low (i.e. true when=0).

During the address phase of the transaction, A[0:35] contains the transaction address. This address is valid during the assertion of AS*. In addition, AP[0:3] reflects the parity of the lowest 32 bits of the transaction's address. Parity is not supported for A[33:35]. These parity bits need only be valid during the assertion of AS* and therefore may be multiplexed with the lowest four data parity bits. The parity's sense (i.e. odd/even and enable/disable) is specified by the PARITY MODE bits, PM[0:2]. Parity is assigned as shown in Table 3:

TABLE 3

| AP[3] | AP[2] | AP[1] | AP[0] |
|---|---|---|---|
| A[31:24] | A[23:16] | A[15:8] | A[0:7] |

During the data phase of the transactions, D[0:63] contains the lowest 64 bits of the transaction. The SIZE bits that specify the individual byte enables are specified as Transaction Attributes. Data is only transferred during the assertion of DS*. D[0:63] may be multiplexed with the address and transaction signals to maintain compatibility with the original MBus definition. The byte ordering convention is defined by the TYPE bits.

During the data phase of the transaction, D[64:127] contains the upper 64 data bits of the transaction. The SIZE bits that specify the individual byte enables are again specified as Transaction Attributes, and data is again only transferred during the assertion of DS*. Note that the D[64:127] bits are optional. The byte ordering convention is defined by the TYPE bits.

During the data phase of the transaction, DP[0:15] specifies the parity of the data bus. The parity's sense (i.e. odd/even and enable/disable) is specified by the PARITY MODE bits, PMD[0:2]. These parity bits need only be valid during the assertion of DS*. DP[0:3] may therefore be multiplexed with AP[0:3]. DP[0:15] are assigned as illustrated in Tables 4 and 5:

TABLE 4

| | | | DP[0:7] | | | | |
|---|---|---|---|---|---|---|---|
| DP[7] | DP[6] | DP[5] | DP[4] | DP[3] | DP[2] | DP[1] | DP[0] |
| D[63–56] | D[55–48] | D[47–40] | D[39–32] | D[31–24] | D[23–16] | D[15–8] | D[7–0] |

TABLE 5

| | | | DP[8:15] | | | | |
|---|---|---|---|---|---|---|---|
| DP[15] | DP[14] | DP[13] | DP[12] | DP[11] | DP[10] | DP[9] | DP[8] |
| D[127–120] | D[119–112] | D[111–104] | D[103–96] | D[95–88] | D[87–80] | D[79–72] | D[71–64] |

The MBus specification identifies a number of transaction attributes that appear as MAD[36:63] during the address phase of every transaction. In contrast, the EM-Bus extension breaks these transaction attribute signals out separately and specifies them as enhancements. The TYPE and the SIZE definitions are extended to handle processor protocols other than SPARC®. For Sparc® processors, the TYPE and SIZE bits retain their interpretation as in the MBus specification. For Intel or Motorola processors, these bits are redefined to handle the idiosyncracies of their respective bus interfaces.

The interpretation of TYPE and SIZE is specified by the EM-Bus IMD bit. The relationship between the original MBus signals AD[0:63], and EM-Bus A[0:35] and transaction attributes are defined in the following Table 6:

TABLE 6

| EMBUS SIGNAL | MBUS SIGNAL | SIGNAL DESCRIPTION |
|---|---|---|
| A[0:35] | MAD[0:35] | PHYSICAL ADDRESS FOR CURRENT TRANSACTION |
| TYPE[0:3] | MAD[36:39] | TRANSACTION TYPE |
| SIZE[0:2] | MAD[40:42] | TRANSACTION SIZE |
| C | MAD[43] | DATA CACHEABLE (A) |
| LOCK | MAD[44] | BUS LOCK INDICATOR (A) |

TABLE 6-continued

| EMBUS SIGNAL | MBUS SIGNAL | SIGNAL DESCRIPTION |
|---|---|---|
| MBL | MAD[45] | BOOT MODE/LOCAL BUS (A)(O) |
| VA[12:19] | MAD[46:53] | VIRTUAL ADDRESS (O) LEVEL 2 |
| RESERVED | MAD[54:58] | RESERVED FOR FUTURE EXPANSION |
| SUP | MAD[59] | SUPERVISOR ACCESS INDICATOR (A)(O) |
| MID[0:3] | MAD[60:63] | MODULE INDENTIFIER |
| TYPE[4:5] | | TRANSACTION TYPE (EXTENSION) |
| SIZE[3:7] | | TRANSACTION TYPE (EXTENSION) |

All of these transaction attributes are valid while AS* is asserted during the address phase.

The TYPE and SIZE definitions are also extended to handle different processors bus characteristics. These extended definitions support processor systems including SPARC, i860, i486 and Motorola 68040, 88000 series, and MIPS R3000 and R4000 series.

During the address phase, TYPE[5:0] specify the Transaction Type. The interpretation of the TYPE bits (either SPARC® MBus compatible or generic interface) is determined by the IMD bit, as shown in Tables 7 and 8

TABLE 7

| | | | MBUS, IMD = 0 | | | | |
|---|---|---|---|---|---|---|---|
| TYPE 5 | TYPE 4 | TYPE 3 | TYPE 2 | TYPE 1 | TYPE 0 | DATA SIZE | TRANSACTION TYPE |
| 0 | 0 | 0 | 0 | 0 | 0 | ANY | WRITE |
| 0 | 0 | 0 | 0 | 0 | 1 | ANY | READ |
| 0 | 0 | 0 | 0 | 1 | 0 | 32 BYTES | COHERENT INVALIDATE |
| 0 | 0 | 0 | 0 | 1 | 1 | 32 BYTES | COHERENT READ |
| 0 | 0 | 0 | 1 | 0 | 0 | ANY | COHERENT WRITE & INVALIDATE |
| 0 | 0 | 0 | 1 | 0 | 1 | 32 BYTES | COHERENT READ & INVALIDATE |
| 0 | ALL OTHER COMBINATIONS | | | | | | RESERVED |

TABLE 8

| | | | GENERIC, IMD = 1 | | | | |
|---|---|---|---|---|---|---|---|
| TYPE 5 | TYPE 4 | TYPE 3 | TYPE 2 | TYPE 1 | TYPE 0 | DATA SIZE | TRANSACTION TYPE |
| 0 | 0 | X | X | X | 0 | ANY | WRITE |
| 0 | X | X | X | X | 1 | ANY | READ |
| 1 | 0 | X | X | X | 0 | DEFAULT BRST | WRITE |
| 1 | X | X | X | X | 1 | DEFAULT BRST | READ |
| 0 | X | X | X | 0 | X | →BUS WIDTH | SEQUENTIAL BURST ORDER |
| 0 | X | X | X | 1 | X | →BUS WIDTH | INTEL BURST ORDER |
| 0 | X | X | 0 | X | X | ANY | SIZE[2:0] ARE SIZE BITS |
| 0 | X | X | 1 | X | X | →BUS WIDTH | SIZE[7:0] ARE BYTE ENABLES |
| 0 | X | 0 | X | X | X | ANY | LITTLE ENDIAN BUS |
| 0 | X | 1 | X | X | X | ANY | BIG ENDIAN BUS |
| 0 | 1 | X | X | X | 0 | ANY | POSTED WRITE |
| 1 | 1 | X | X | X | 1 | DEFAULT BRST | POSTED WRITE |

The functions of each bit of TYPE|5:0| in the generic mode (IMD=1) are explained in the following:

TYPE|0| identifies READ and WRITE. When 0 this bit indicates the transaction is a read. When 1 this bit indicates the transaction is a write.

TYPE|1| identifies the BURST ORDER, such as sequential or non-sequential burst. When TYPE|1|=0 the burst order is sequential. When TYPE|1|=1 the burst order is non-sequential. Given a system bus of width N bytes (N=4, 8 or 16), any transaction of SIZE S>N constitutes a burst (where S=kN, k=$2^i$, i an integer>1, and Nk≤5128 bytes).

TYPE|2| bits have two alternative interpretations. When TYPE|2|=0, the transaction length in bytes is given by the value of SIZE|2:0|. When TYPE|2|=1, the byte(s) that are enabled in the transaction are specified when their respective size bits are asserted low (e.g. SIZE|N|* means BYTE|N| participates in the transaction). For elaboration see the SIZE|7:0| definition.

TYPE|3| specifies LITTLE ENDIAN AND BIG ENDIAN. Processors may define the position of BYTE 0 on the bus in either of two ways. Either BYTE 0 appears as the lowest byte on the bus (D[7:0]–little endian, TYPE[3]=0) or BYTE 0 appears as the highest byte on the bus (big endian–D[M:M-7], where M=$B_w$-1, $B_w$ is the bus width bits, TYPE[3]=1). For elaboration see the definition of the SIZE[7:0] bits.

TYPE[4] relates to WRITE POSTING. When TYPE[4]=1, the write data is posted into the write FIFO, where it remains until the next read is completed. This can be used to postpone the actual DRAM write until after the DRAM read is completed, thereby speeding cache line fills.

TYPE|5| specifies DEFAULT BURST MODE. When TYPE|5|=0, the transaction's size is specified by the SIZE |7:0| (which are interpreted according to TYPE|2|). When TYPE|5|=1, the transaction's size is specified by the default burst size programmed into the command register.

SIZE|7:0| are provided to tell the memory system the data TRANSACTION SIZE. During the address phase, SIZE |2:0| specify the number of bytes to be transferred during a bus transaction. SIZE|7:3| was added to the original MBus specification to offer byte enabled and misaligned data transfers compatible with the i486 and 68040 processors. The interpretation of SIZE is determined by TYPE|2| as shown in Tables 9–13:

TABLE 9

SIZE INTERPRETATION WITH TYPE|2|=0, SIZE|7:3|=XXXX

| SIZE 3 | SIZE 2 | SIZE 1 | SIZE 0 | TRANSACTION SIZE |
|---|---|---|---|---|
| 0 | 0 | 0 | 0 | BYTE |
| 0 | 0 | 0 | 1 | HALF-WORD (2 - BYTES) |
| 0 | 0 | 1 | 0 | WORD (4 - BYTES) |
| 0 | 0 | 1 | 1 | DOUBLE WORD (8 - BYTES) |
| 0 | 1 | 0 | 0 | 16 BYTE BURST |
| 0 | 1 | 0 | 1 | 32 BYTE BURST |
| 0 | 1 | 1 | 0 | 64 BYTE BURST |
| 0 | 1 | 1 | 1 | 128 BYTE BURST |

TABLE 10

SIZE INTERPRETATION WITH TYPE|2|=1

| SIZE 7 (BY7*) | SIZE 6 (BY6*) | SIZE 5 (BY5*) | SIZE 4 (BY4*) | SIZE 3 (BY3*) | SIZE 2 (BY2*) | SIZE 1 (BY1*) | SIZE 0 (BY0*) | TRANSACTION BIG ENDIAN | TRANSACTION LITTLE ENDIAN |
|---|---|---|---|---|---|---|---|---|---|
| X | X | X | X | X | X | X | 0 | BYTE D[63:54] | BYTE D[7:0] |
| X | X | X | X | X | X | 0 | X | BYTE D[55:48] | BYTE D[15:8] |
| X | X | X | X | X | 0 | X | X | BYTE D[47:40] | BYTE D[23:16] |
| X | X | X | X | 0 | X | X | X | BYTE D[39:32] | BYTE D[31:24] |
| X | X | X | 0 | X | X | X | X | BYTE D[31:24] | BYTE D[39:32] |
| X | X | 0 | X | X | X | X | X | BYTE D[23:16] | BYTE D[47:40] |
| X | 0 | X | X | X | X | X | X | BYTE D[15:8] | BYTE D[55:48] |
| 0 | X | X | X | X | X | X | X | BYTE D[7:0] | BYTE D[63:54] |

Any combination of Byte Enables may be asserted simultaneously. Processors generally require their byte enable signals to be continguous. No checking is performed to distinguish invalid combinations from valid combinations.

TABLE 11

SIZE INTERPRETATION WITH TYPE|2|=0 AS FUNCTION OF ADDRESSES
32, 64 & 128 BIT SYSTEM BUS SIZES, TYPE|3|=0 (LITTLE ENDIAN), SIZE|7:3|=X

| SIZ|2:0|=0 A|2:0|=111 AD|63:56| BYTE 7 | SIZ|2:0|=0 A|2:0|=110 AD|55:48| BYTE 6 | SIZ|2:0|=0 A|2:0|=101 AD|47:40| BYTE 5 | SIZ|2:0|=0 A|2:0|=100 AD|39:32| BYTE 4 | SIZ|2:0|=0 A|2:0|=011 AD|31:24| BYTE 3 | SIZ|2:0|=0 A|2:0|=010 AD|23:16| BYTE 2 | SIZ|2:0|=0 A|2:0|=001 AD|15:8| BYTE 1 | SIZ|2:0|=0 A|2:0|=000 AD|7:0| BYTE 0 |
|---|---|---|---|---|---|---|---|
| SIZ|2:0|=001 A|2:0|=11X HALFWORD 3 | | SIZ|2:0|=001 A|2:0|=10X HALFWORD 2 | | SIZ|2:0|=001 A|2:0|=01X HALFWORD 1 | | SIZ|2:0|=001 A|2:0|00X HALFWORD 0 | |
| SIZ|2:0|=010 A|2:0|=1XX WORD 1 | | | | SIZ|2:0|=010 A|2:0|=0XX WORD 0 | | | |

TABLE 12

SIZE INTERPRETATION WITH TYPE|2|=0 AS FUNCTION OF ADDRESSES 32 BIT SYSTEM BUS SIZES, TYPE|3|=1 (BIG ENDIAN), SIZE|7:4|=X

| SIZ[2:0]=0 | SIZ[2:0]=0 | SIZ[2:0]=0 | SIZ[2:0]=0 |
|---|---|---|---|
| A[1:0]=00 | A[1:0]=01 | A[1:0]=10 | A[1:0]=11 |
| AD[31:24] | AD[23:16] | AD[15:8] | AD[7:0] |
| BYTE 0 | BYTE 1 | BYTE 2 | BYTE 3 |
| SIZ[2:0]=001 | | SIZ[2:0]=001 | |
| A[1:0]=00X | | A[2:0]=01X | |
| HALFWORD 0 | | HALFWORD 1 | |
| | SIZ[2:0]=010 | | |
| | A[2:0]=0XX | | |
| | WORD 0 | | |

TABLE 13

SIZE INTERPRETATION WITH TYPE|2|=0 AS FUNCTION OF ADDRESSES 64 & 128 BIT SYSTEM BUS SIZES, TYPE|3|=1 (BIG ENDIAN), SIZE|7:3|=X

| SIZ[2:0]=0 | SIZ[2:0]=0 | SIZ[2:0]=0 | SIZ[2:0]=0 | SIZ[2:0]=0 | SIZ[2:0]=0 | SIZ[2:0]=0 | SIZ[2:0]=0 |
|---|---|---|---|---|---|---|---|
| A[2:0]=000 | A[2:0]=011 | A[2:0]=010 | A[2:0]011 | A[2:0]=100 | A[2:0]=101 | A[2:0]=110 | A[2:0]=111 |
| AD[63:56] | AD[55:48] | AD[47:40] | AD[39:32] | AD[31:24] | AD[23:16] | AD[15:8] | AD[7:0] |
| BYTE 0 | BYTE 1 | BYTE 2 | BYTE 3 | BYTE 4 | BYTE 5 | BYTE 6 | BYTE 7 |
| SIZ[2:0]=001 | | SIZ[2:0]=001 | | SIZ[2:0]=001 | | SIZ[2:0]=001 | |
| A[2:0]=00X | | A[2:0]=01X | | A[2:0]=10X | | A[2:0]=11X | |
| HALFWORD 0 | | HALFWORD 1 | | HALFWORD 2 | | HALFWORD 3 | |
| SIZ[2:0]=010 | | | | SIZ[2:0]=010 | | | |
| A[2:0]=0XX | | | | A[2:0]=1XX | | | |
| WORD 0 | | | | WORD 1 | | | |

ID[3:0]. The ID bits identification have two interpretations. When IMD=0 the ID interpretation is strictly MBus compatible, as shown in Table 14. Then the ID field selects various configuration spaces within the MBus address space for access to the Port Register and other I/O registers. When used in non-MBus applications (IMD=1), the ID bits are used in conjunction with address signals to define the nature of the bus transaction and select I/O registers or dram memory. A match is required between ID[3:0] and the fixed values shown in the Table 15 for the defined generic (non MBus) operations.

TABLE 14

| ID[3:0] WHEN IMD=0, MBUS APPLICATIONS | |
|---|---|
| MBUS CONFIGURATION SPACE | ID[3:0] |
| F/F000/0000(h) to F/F0FF/FFFF(h) | 0(h) reserved for boot prom |
| F/F100/0000(h) to F/F1FF/FFFF(h) | 1(h) |
| ● ● | ● |
| F/Fn00/0000(h) to F/Fn00/0000(h) | n(H) |
| ● ● | . |
| F/FE00/0000(h) to F/FEFF/FFFF(h) | E(h) |
| F/FF00/0000(h) to F/FFFF/FFFF(h) | F(h) |

TABLE 15

| ID[3:0] WHEN IMD=1, GENERIC APPLICATIONS | | | | |
|---|---|---|---|---|
| ID[3] | ID[2] | ID[1] | ID[0] | DRAM MODULE SELECTION |
| M/IO*=0 | D/C*=0 | X | X | NOT SELECTED |
| M/IO*=0 | D/C*=1 | 1 | 0 | INDIRECT ADDRESS REGISTER |

TABLE 15-continued

| ID[3:0] WHEN IMD=1, GENERIC APPLICATIONS | | | | |
|---|---|---|---|---|
| ID[3] | ID[2] | ID[1] | ID[0] | DRAM MODULE SELECTION |
| M/IO*=0 | D/C*=1 | 0 | 1 | I/O REGISTERS |
| M/IO*=1 | D/C*=X | X | X | MEMORY |

The Parity Mode bits PMD|0:2| specify the parity computation algorithm and identify those signals that participate in the parity computation. They are valid during the entire system bus cycle. These bits are defined as shown in Table 16:

TABLE 16

| PM[2] | PM[1] | PM[0] | PARITY MODE |
|---|---|---|---|
| X | 0 | 0 | PARITY COMPUTATION DISABLED |
| X | 0 | 1 | ADDRESS PARITY COMPUTED |
| X | 1 | 0 | DATA PARITY COMPUTED |
| X | 1 | 1 | ADDRESS & DATA PARITY COMPUTED |
| 0 | X | X | ODD PARITY COMPUTED |
| 1 | X | X | EVEN PARITY COMPUTED |

DS* is asserted by the bus master during the data phase of the transaction. Data is transferred and BACK[0:2]* is valid during every cycle that DS* is asserted. The master can use DS* to control (slow) the slave's response on a cycle-by-cycle basis. Note that MBus does not have a DS* signal.

The default burst length is specified by SIZE[0:3] during the address phase of every transaction. BLST* may be used by the bus master to override the default burst length, prematurely terminating bus transactions during the cycle asserted. BLST* is only recognized during cycles in which DS* is also asserted.

DRPA* is provided by the bus master to indicate that the next main memory access will occur within the same DRAM page as the previous access. The main memory subsystem can use this signal to avoid an unnecessary RAS precharge to the DRAM array. This signal is only used in a single processor system.

BACK[0:2]* are identical to MRDY*, MRTY* and MERR* in MBus. The following Tables 17 and 18 summarize their function:

TABLE 17

| | When IMD = 0 | | |
|---|---|---|---|
| BACK[2] (MERR*) | BACK[1] (MRDY*) | BACK[0] (MRTY*) | DEFINITION |
| 0 | 0 | 0 | RETRY |
| 0 | 0 | 1 | ERROR3 - UNCORRECTABLE |
| 0 | 1 | 0 | ERROR2 - TIMEOUT |
| 0 | 1 | 1 | ERROR1 -BUS ERROR |
| 1 | 0 | 0 | UNDEFINED (L1) OR RESERVED (L2) |
| 1 | 0 | 1 | VALID DATA TRANSFER |
| 1 | 1 | 0 | RELINQUISH AND RETRY |
| 1 | 1 | 1 | IDLE CYCLE |

TABLE 18

| | WHEN IMD=1 | | | |
|---|---|---|---|---|
| BACK[2] ERR* | BACK[1] ACK* | BACK[0] RTY* | DRC DEFINITION | GENERIC DEFINITION |
| 1 | 0 | 1 | VALID DATA TRANSFER | VALID DATA TRANSFER |
| 0 | 0 | 1 | UNCORRECTABLE | ERROR EXCEPTION |
| 1 | 1 | 1 | IDLE CYCLE | IDLE CYCLE |

3. DRAC STRUCTURE

Figure 3:
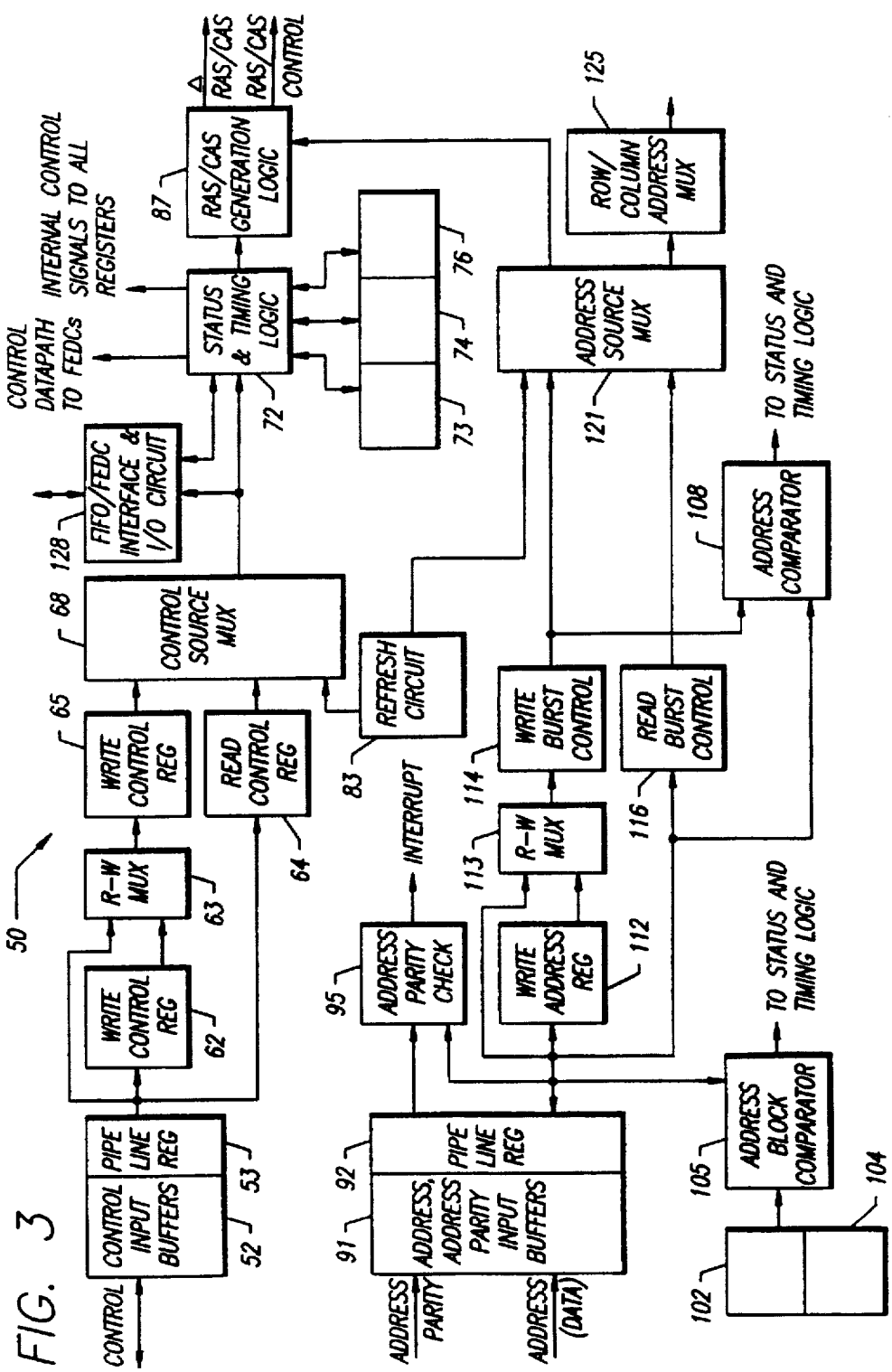
FIG. 3 shows a block diagram of an embodiment of a control circuit of a memory controller constructed in accordance with the present invention.
Figure 4:
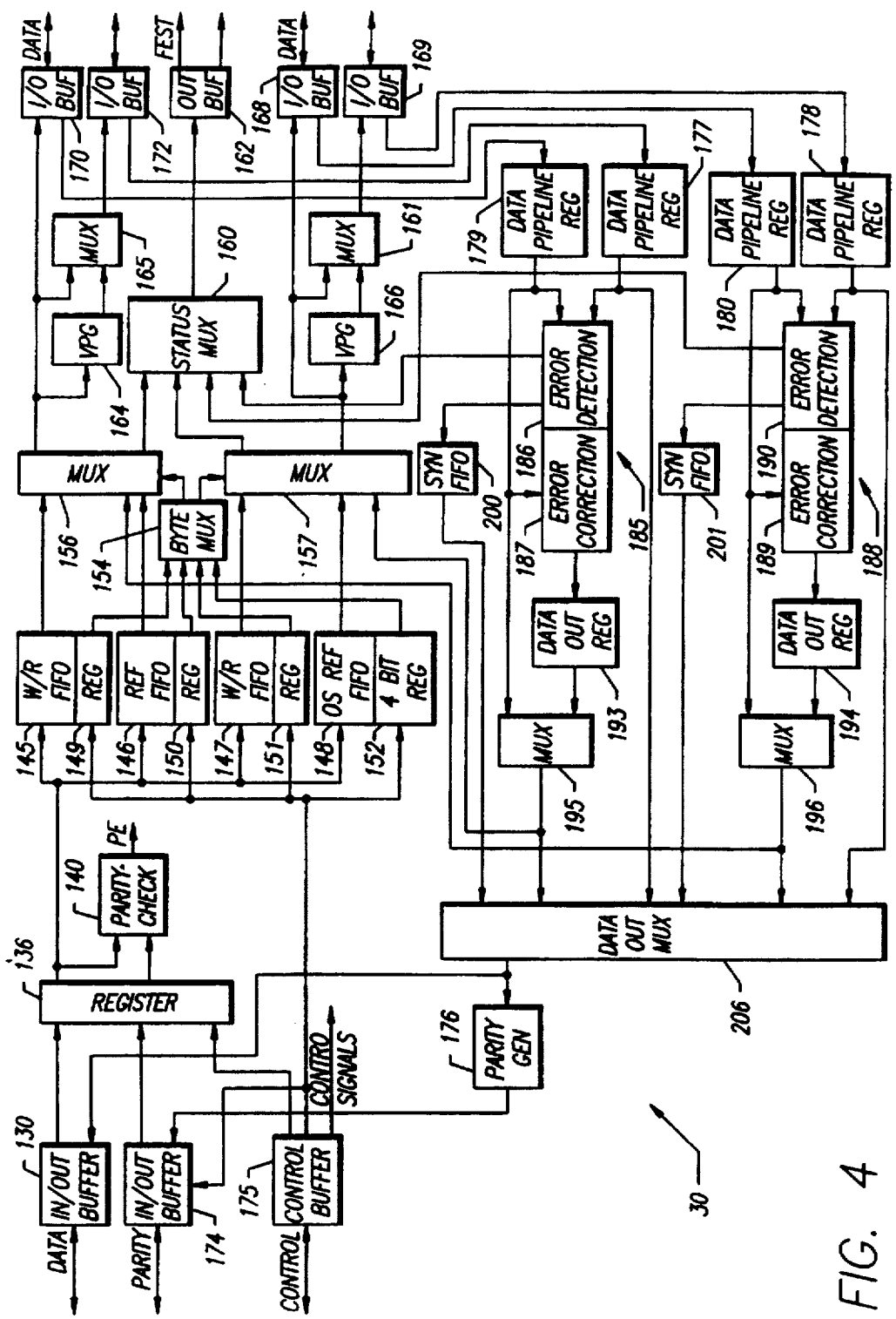
FIG. 4 shows a block diagram of an embodiment of a data sending and receiving circuit of a memory controller circuit constructed in accordance with the present invention.

An embodiment of a DRAM control device (DRAC) 50, constructed in accordance with the invention, is shown in FIG. 3. Recall that all bus transactions are divided into an address/control phase followed by a data phase. During the address/control phase specified by AS*, the control signals are routed over the system bus into DRAC 50 through a control input buffer 52 and stored in a pipeline register 53. In addition, address signals AD [35:0] and address parity signals ADP [3:0] are routed into DRAC 50 from the system bus through address and address parity input buffer 91 and are synchronously clocked into pipeline register 92.

Also during the address/control phase, address signals AD[35:0] contain the transaction address. This address remains valid during the assertion of AS*. The address parity is checked by address parity check circuit 95 after the address enters DRAC 50. A single parity bit is computed for each byte of the address signal and checked against the four address parity bits of the address parity signal ADP [3:0]. ADP[3:0] reflects the parity of the lowest 32 bits of the transaction address. The address parity may be optionally multiplexed with the data parity. Address parity is not supported for bits [35:33] in the AD[35:0]. The parity's sense (i.e. odd/even and enable/disable) is specified by PMD. The nature of the parity computation is specified every bus cycle by PMD.

When an address parity error occurs, the transaction is terminated and bus error signal BERR is asserted. An address bus parity error bit is set in a status register 76 in DRAC 50. BERR also indicates the bus parity error condition during the data phase of a transaction. This signal is asserted asynchronously (i.e. one or more clocks late), and is valid one clock after the error occurs and lasts until cleared. The signal is cleared by writing the appropriate bit in command register 73 in DRAC 50.

All synchronous inputs from the system bus are assumed to be valid at the rising edge of the clock. Some of the synchronous control inputs are rendered valid by the assertion of AS* during the address phase of a bus cycle. These latter control inputs include the signal IMD for identifying the bus type, the signal TYPE for specifying data transaction type, and the signal SIZE for specifying data transaction size.

In accordance with the present invention, the address path and control path of DRAC 50 are respectively split so that cache purge operations can be supported. The address path includes a read address path for read transactions (including all standard MBus read transactions), and a write address path. The write address path further includes a first path for the first of two consecutive write transaction addresses, and a second path for the second of two consecutive write transaction addresses which follows the first write transaction. A write address register 112 is provided in the second path to hold the second address signal. It should be mentioned that processors normally have no mechanism to hold a data transaction address until the address is acknowledged. The configuration of the DRAC 50 of the present invention allows more efficient data transactions. The control path includes a read control signal path for normal and reflective-read control signals, and a write control signal path. The write control signal path is also provided with a first path for the first of two consecutive write control signals, and a second path for the second of two consecutive write control signals. The second write control signal is associated with a second transaction that immediately follows the first write transaction with which the first write control signal is associated. A write control register 62 is provided in the second path to hold the second control signal.

Multiplexers 63 and 113 are used respectively to select write address/control signals from the normal write and posted-write address/control signals. The selected write control signals and write address signals are respectively sent to write control register 65 and write burst counter 114. The read control signals and the read address signals are respectively stored in read control register 64 and read burst counter 116. The contents of write and read control registers 64 and 65 are selected by control source multiplexer 68 along with refresh control signals from refresh control circuit 83. The selected signal from control source multiplexer 68 is then sent to status and timing control logic 72. The addresses from the uppermost portions of read and write address burst counters 114 and 116 are multiplexed with the address from a refresh address counter in refresh control circuit 83 by address source multiplexer 121. The address for the DRAM operation will originate from one of these three sources (i.e. write burst counter 114, read burst counter 116 or refresh control circuit 83). The particular source is determined by status and timing control logic 72. Write address burst counter 114 supplies the address during writes, read modify writes (that are writes of byte(s) less than a word), inhibited DRAM writes, and posted writes that allow a conversion from normal writes to reads for ownership cycles. Read address burst counter 116 supplies the address during normal read and reflective-read, the latter being a conversion from a normal read to a coherent read with a synchronous write of the read data into main memory.

The refresh control circuit 83 supplies all address control information during refresh/scrubbing operations. All DRAM requires refresh. The capacitive storage cells of DRAM will lose their contents unless periodically recharged. Memory refresh requirements vary depending on the density and organization of the memory chips comprising the memory. However, rows must be refreshed at the same time interval. During refresh, all banks of a given block are scrubbed (i.e. checked for single bit errors and corrected if necessary) simultaneously at a particular address. A more detailed description of the refresh/scrubbing process is presented later in this specification.

When a read is occurring and a posted write signal was asserted on the previous write operation, the contents of address pipeline register 92 is compared by address comparator 108 with the posted write address in write address register 112. If the two addresses match, the posted write precedes the read operation. Otherwise, the incoming read occurs immediately with the posted write occurring after the read is completed. The lowest seven bits of the address bus are excluded from the comparison. Therefore, a posted write's burst address span can overlap (or contain or be contained within) the read's burst address span while still maintaining coherency in DRAM 50.

The output of source address multiplexer 121 flows into row/column address multiplexer 125 which includes a row/column pre-multiplexer and row/column address multiplexer. In the row/column pre-multiplexer the address signal is divided into a row address and column address, depending on the size of the DRAM chips in the accessed block of the DPAM structure which is selected by address block comparator 105. The divided address then flows into the row/column address multiplexer which creates the actual address for the DRAM under control of RAS/CAS generation logic 87.

Main memory transactions may be subdivided into several system bus accesses which together form a burst transaction. Write and read address counters 114 and 116 are each split into two overlapping portions. The lower portion of each counter controls the burst over the system bus. The upper portion of each counter controls the burst into main memory. Further, the upper and lower portions of each counter overlap at address bits 2 and 3, with these bits used to identify the channels in the DSRD and thereby specifying the selected bank or banks within the memory addressed by the DRAC 50. The interpretation of the counter's address outputs depends on the system bus size such as 32-, 64- or 128-bits and the EDC's width in the DSRD such as 32- or 64-bits and the data transaction size information.

The definition of a burst-type transaction is as follows. Given a system bus of width N bytes (N=4, 8 or 16), any transaction of SIZE S>N constitutes a burst (where S=kN, k=$2^i$ (i.e. the number of system bus transactions in a burst), i an integer$\geq$1, and kN$\leq$128 bytes). During bursts the lowest $\log_2 N$ bits of the address, A[$\log_2 N-1$]:0 ], bus are fixed at 0 (the alignment constraint). The next $\log_2 k$ bits, A[($\log_2 k + \log_2 N - 1$): ($\log_2 N$)] form the burst counter for the transaction. When the TYPE bits indicate that the burst order is sequential, subsequent addresses are generated by sequentially incrementing these $\log_2 k$ bits of the address. After reaching the address in which all $\log_2 k$ bits are 1's the counter wraps around to 0, where all $\log_2 k$ bits are low. High-order addresses A[35:$\log_2 k + \log_2 N$] remain fixed.

When TYPE[1]=1 the burst counter increments in the nonsequential fashion characteristic of Intel processors. The lowest $\log_2 N$ bits are again fixed at 0 (the alignment constraint). The next $\log_2 k$ bits, A[($\log_2 k + \log_2 N - 1$): ($\log_2 N$)] form the burst counter for the transaction. In an example of an eight transaction burst, letting n=$\log_2 N$ and fixing the bits A[(n−1):0] to binary zero to force alignment to the system bus boundary, the next $\log_2 k$ bits A[(n+2):n] form the burst counter for the transaction. These bits are incremented in the following fashion (An asterisk (*) indicates the bit(s) being toggled to a binary one):

| Sys. Bus Transaction | | | |
|---|---|---|---|
| 0 | An+2  | An+1  | An  |
| 1 | An+2  | An+1  | An* |
| 2 | An+2  | An+1* | An  |
| 3 | An+2  | An+1* | An* |
| 4 | An+2* | An+1  | An  |
| 5 | An+2* | An+1  | An* |
| 6 | An+2* | An+1* | An  |
| 7 | An+2* | An+1* | An* |

In the embodiment of the EMbus in accordance with the present invention, TYPE[1] identifies the burst order, i.e. sequential or non-sequential.

When a system burst occurs the data transfer begins at the programmed address. During normal operation, subsequent addresses will be generated by incrementing the system bus burst counter modulo the burst length. The counter's address will wrap around when it reaches the highest value for a given programmed burst length. Bursts must terminate after the programmed burst length or may terminate early with the assertion of BLST. Burst addresses are not always incremented sequentially.

The Intel 486 processor requires a special burst order for addressing. This order is supported by specifying the Intel burst mode. Even during bursts using Intel's non-sequential order, the counter will not increment outside of the address boundary specified by the burst length. System burst read and write transfers occur on N bit aligned boundaries for systems using bus widths of N bits (N=32, 64, or 128).

An inhibit signal is provided to instruct the DRAC 50 to abort an ongoing read request which allows reflective-read transactions and coherent read transactions. This signal is asserted by the owner of the cache block in a multiprocessing environment, so that it can supply data to the requesting cache while main memory access is inhibited. This input can also be used in multi-processing environments to convert inhibited DRAM read operations to write operations, thereby implementing a reflective memory. When a snooping cache determines that it owns the valid copy of the data, it supplies that data over the bus to the requesting cache. The main memory is updated simultaneously.

When a processor attempts to write data in a multiprocessing environment, its local cache must determine the status (cacheable or write-through, hit or miss) of the data line in question. When the write operation occurs to a line that is cacheable, a hit may occur in a second snooping cache that has previously modified the same line and contains the only valid copy. The DRAM controller inhibits the ongoing write operation when the snooping cache supplies data to the requesting cache. When a valid copy of the data is not present in a snooping cache, the write operation into DRAM can be inhibited and converted to a read operation at the same address.

During read or write operations, the snoop window is extended until CAS is asserted. These time intervals are programmable in conjunction with all the other DRAM timings. Alternatively, an external input is provided to extend the window until all other devices on the system bus have completed their snoop cycles.

Status and timing control logic 72 includes a bus status circuit which produces bus transaction type identification signals (FET) to the data sending and receiving device (DSRD), and a memory status circuit to produce memory cycle identification signals (FEDRT) to the DSRD.

In accordance with the present invention, the timing control logic 72 includes several programmable registers which are used to program system set-up and status information to support different system requirements. The following tables are provided to better understand these programmable registers. In the tables, the first row lists the bit number. The second row lists the name of the bit. The third row gives the values assigned to the bit after system reset is asserted. The fourth row lists the lowest 4 nibbles of the register byte's address. The highest addresses will depend on the interface mode specified by IMD. All values listed are given in binary or hex (h). All signals are active high.

Each register (except MBus specific port registers) is spaced 16 bytes apart in the address space so that its contents will be accessible on the lowest 8 bits of the data bus regardless of system bus width.

Programmable (read and write) command register 73 includes four bytes, for example, which are respectively defined in Tables 19–22.

TABLE 19

| CR7 | CR[6:0] |
|---|---|
| CIE | RFD[6:0] |
| 0 | 3F(h) |
| | Address 0000(h) |

RFD[6:0] is a Refresh Counter Divisor. These bits divide CLK down to 1 MHz.

CIE is a Coherent Invalidate Acknowledge Enable. When this bit is set high it enables MBus to Coherent Invalidate cycles. BACK is generated 2 clocks after the address phase in which the Type bits specify this cycle. Systems requiring different acknowledge delays should set CIE=0 and use an external PLD to generate the acknowledge.

TABLE 20

| CR[15] | CR[14] | CR[13:12] | CR11 | CR[10:9] | CR8 |
|---|---|---|---|---|---|
| SPARE | INIT | SBS | ES | BLKS[1:0] | IE |
| 0 | 0 | 00 | 0 | 00 | 0 |
| | | | Address 0010(h) | | |

IE enables the interrupts to the system bus.
BLKS[1:0] defines the number of blocks in binary. The value in binary is one less than the number of blocks, e.g. 0 (h)=1 blocks, 3 (h)=4 blocks.
ES specifies the number of data bits in each EDC packet, or EDC size. 0 specifies 32 Bits, while 1 specifies 64 Bits.
SBS specifies the number of data bits in the system bus, or alternatively, the system bus size. 00 specifies 32 Bits, while 01 specifies 64 Bits. Likewise, 10 specifies 128 Bits.
INIT triggers an initialization of the DRAM memory and its check bits.

TABLE 21

| CR[23:20] | CR[19:18] | CR[17:16] |
|---|---|---|
| SPARE | PLL[1:0] | DFB[1:0] |
| 0 | 0 | 0 |
| | Address 0020(h) | |

DFB[1:0] indicates the default burst length for cache line read/writes. These bits are defined in a similar way to the input SIZE bits. The bus executes burst transactions with this default length when the appropriate TYPE bit is asserted during the address phase of a transaction. They are interpreted as follows:

| DFB[1:0] | Default Burst Length |
|---|---|
| 00 | 16 Bytes |
| 01 | 32 Bytes |
| 10 | 64 Bytes |
| 11 | 128 Bytes |

PLL[1:0] programs the multiplication factor from the incoming bus clock (CLK) to MCLK. The PLL bits are defined as follows:

| PLL[1:0] | MCLK |
|---|---|
| 00 | UNUSED |
| 01 | X2 (40 or 50 MHz bus clock) |
| 10 | X3 (33 MHz bus clock) |
| 11 | X4 (25 MHz bus clock) |

The multiple frequency clock input is provided by a bus frequency multiplication circuit to set the memory timing to 10 ns (except 12.5 ns for 40 MHz bus) regardless of system bus clock frequency. This result is achieved by the use of programmable timing register 74. The bus frequency multiplication circuit can be a phase locked loop (PLL) circuit which is preferably incorporated inside the memory controller chip (not shown). Under this arrangement, the memory timing is controlled internally, not externally.

TABLE 22

| CR31 | CR30 | CR29 | CR28 | CR27 | CR26 | CR25 | CR24 |
|---|---|---|---|---|---|---|---|
| CBERR | EDC | EDBP | EABP | ESEW | EMEW | ERMW | ETME |
| 0 | 0 | 0 | 0 | 0 | 0 | 0 | 0 |
| | | | Address 0020(h) | | | | |

ETME Enables the interrupt indicating that the error log FIFO in the DSRD is full.
ERMW Enables the interrupt indicating that a multiple error has occurred on a Read-Modify-Write Cycle.
EMEW Enables the interrupt indicating two or more errors in a single word.
ESEW Enables the interrupt indicating that a single correctable error has occurred in a single word.
EABP Enables the interrupt indicating that one of the address bytes has a parity error.
EDBP Enables the interrupt indicating that one of the data bytes has a parity error.
EDC Enables the correction of single bit errors in the data path.
CBERR Clears the condition asserting BERR on the system bus.

Programmable (read and write) DRAM timing register 74 includes eight bytes, for example, which store the timing of various control signals for DRAM operations under enhanced timing resolution. These timing signals are defined in tables 23 and 24.

TABLE 23

| DT3[7:0] | | DT2[7:0] | | DT1[7:0] | | DT0[7:0] | |
|---|---|---|---|---|---|---|---|
| tRIN | tDC | tCP | tRPR | tCPW | tMAC | tRAM | tAR |
| F(h) | F(h) | F(h) | F(h) | F(h) | F(h) | F(h) | F(h) |
| Address | | Address | | Address | | Address | |
| 00F0(h) | | 00E0(h) | | 00D0(h) | | 00C0(h) | |

TABLE 24

| DT3|7:0| | | DT2|7:0| | | DT1|7:0| | | DT0|7:0| | |
|---|---|---|---|---|---|---|---|
| SPARE | SPARE | SPARE | SPARE | SPARE | SPARE | SPARE | tENR |
| F(h) | F(h) | F(h) | F(h) | F(h) | F(h) | F(h) | F(h) |
| Address 00F0(h) | | Address 00E0(h) | | Address 00D0(h) | | Address 00C0(h) | |

All timing values are set with 4-bit values. The time intervals are specified to 10 ns. accuracy when MCLK is running at 100 MHz (12.5 ns for 40 MHz bus clock). All timings may be resolved to 1/n of tP, where n is the PLL multiplier (e.g. 50 MHz systems having a PLL multiplier of 2 with tP=20 ns can have DRAM timing resolutions defined to 10 ns). Therefore, unless the timing values are constrained, the DRAM read data could arrive at the DSRD on a 10 ns boundary rather than a 20 ns boundary of the bus clock.

The following defines the programmable time intervals that are available.

tAR programs the time interval between start of address signal and RAS assertion.

tRAM programs the time interval between start of RAS and the multiplexed address.

tMAC programs the time interval between start of the multiplexed address and CAS assertion.

tCPW programs the CAS pulse width.

tRPR programs the RAS precharge width.

tCP programs the CAS precharge width.

tDC programs the FIFO data delay to CAS assertion.

tRIN programs the RAS completion during non-reflective Inhibit.

tENR programs the Enable delay of FESTRB on read.

tACC programs the DRAM access time (determined by DRAM chips).

tCLZ programs the DRAM CAS to Output Low Z (determined by DRAM chips).

tp programs the Bus CLK period.

DRAC 50 of the present invention is also provided with programmable (read and write) block placement register 102 which includes eight bytes, for example, for storing locations of the blocks of the DRAM in the overall memory map and the population code or size of each block of the DRAM. The arrangement of block placement register 102 is defined in Table 25.

TABLE 25

| B3PR[15:0] | | B2PR[15:0] | | B1PR[15:0] | | B0PR[15:0] | |
|---|---|---|---|---|---|---|---|
| P3[1:0] | BA3[35:22] | P2[1:0] | BA2[35:22] | P1[1:0] | BA1[35:22] | P0[1:0] | BA0[35:22] |
| 0(h) | 0(h) | 0(h) | 0(h) | 0(h) | 0(h) | 0(h) | 0(h) |
| Address | Address | Address | Address | Address | Address | Address | Address |
| 170(h) | 160(h) | 150(h) | 140(h) | 130(h) | 120(h) | 110(h) | 100(h) |

BA(N)|35:22| indicates Block N Location (0≦N≦3), which specifies the location of Block N of the Memory in the overall memory map. Block N is selected when the incoming address bits A|35:22| match the BA(N)|35:22| bits. Any bits in the BA(N) field can be masked and therefore not considered in the comparison. Comparisons do not begin until the Init Bit is set in the Command Register.

P(N)|1:0| indicates Population Code (0<N<3), which specifies the DRAM chip size installed in all banks of Block N. The population codes are defined as follows:

| | |
|---|---|
| 00 | 256K depth (i.e. 256K × 1 or 256K × 4) |
| 01 | 1M depth (i.e. 1M × 1 or 1M × 4) |
| 10 | 4M depth (i.e. 4M × 1 or 4M × 4) |
| 11 | 16M depth (i.e. 16M × 1) |

Programmable (read and write) block mask register 104 is associated with block placement register 102, which includes eight bytes. Block mask register 104 is used, for example, for masking certain bit(s) in block placement register 102. The masked bits in the register 102 will not be considered in a memory map address comparison. The arrangement of register 104 is shown in Table 26.

TABLE 26

| B3MR[15:0] | | B2MR[15:0] | | B1MR[15:0] | | B0MR[15:0] | |
|---|---|---|---|---|---|---|---|
| SPARE | BM3[35:22] | SPARE | BM2[35:22] | SPARE | BM1[35:22] | SPARE | BM0[35:22] |
| 0(h) | 0(h) | 0(h) | 0(h) | 0(h) | 0(h) | 0(h) | 0(h) |
| Address | Address | Address | Address | Address | Address | Address | Address |
| 1F0(h) | 1E0(h) | 1D0(h) | 1C0(h) | 1B0(h) | 1A0(h) | 190(h) | 180(h) |

BM(N)[35:22] means Block N Mask (0≦N≦3), which indicates whether a particular bit in the Block Placement Register is considered during memory map address comparison. Summarizing the mask definition:

BM(N)[X]=0:Ignore Bit X when comparing AD[35:22] against BA(N)[35:22].

BM(N)[X]=1:Include Bit X when comparing AD[35:22] against BA(N)[35:22].

Address block comparator 105 is coupled with pipeline register 92 and block placement register 102 for comparing an incoming system bus address with the locations of the 4 blocks stored in placement register 102. When a match occurs the incoming address is transferred to write address register 112 (which holds the address when the write FIFOS in the DSRD are occupied from a previous transfer, or during posted writes), or to read or write burst address counters 114 and 116 under control of status and timing control logic 72.

In accordance with the present invention, DRAC 50 is also provided with status register 76 to store status information from DSRD. This information includes the status of FIFOS and the status of errors occurring during operations. Status register 76 allows status and timing control logic 72 to select proper channels and set interruptions of the system in an efficient manner. DRAC 50 may further be provided with an indirect address register for storing addresses of other registers inside DRAC 50, and an error location register for storing the address of the most recent error.

FEDC 30 may further include two or more read-only error log or Syn FIFO and check bit registers (inside FEDC), each of which can have four bytes for respectively storing syndrome bits reflecting EDC syndrome bits on an error condition, syndrome (SYN) FIFO empty flag bits, and check bits reflecting the EDC check bits that were present during the previous read operation.

FEDC 30 may also be provided with an MBus port register (not shown) for storing vendor codes for MBus compatible devices, revision levels for MBus compatible devices, and device number specifying a vendor specific MBus device present at this port.

Asynchronous inputs RSTIN are used to reset or initialize DRAC 50 after initial power up. RSTIN signals are asserted for at least four clock cycles. After RSTIN is asserted, all bits in command register 73 and status register 76 are initialized to predetermined values. After RSTIN is deasserted, the host programs command register 73 with correct values of the system and set initialization bit (INIT). RSTIN is synchronized to the CLK inside DRAC 50 and the DSRD. The memory controller will respond by clearing the entire DRAM and appropriately initializing the EDC bits in the DSRD.

Non-multiplexed system buses interface to DRAC 50 with address lines only. The control and status registers inside DRAC 50 must be accessible via the system's data bus. An additional eight-bit data path is provided between the FEDCs and DRAC 50 to facilitate programming DRAC 50 control registers and reading status. All I/O transactions occur through the FEDC into DRAC 50 on a byte wide basis.

The following three signals are used to control the system bus, preventing FIFO overflow, while reflective memory operations are being completed. The DRAM controller requests the bus by asserting BR one clock cycle after receiving an inhibit in reflective memory systems. The system arbitration logic asserts BG, granting the use of the bus to the main memory controller which, in turn, responds with BB indicating a bus busy condition as soon as the current bus master releases its hold on BB. BR is given the highest priority by the arbitration logic in an MBus reflective memory system.

Other systems may implement reflective memories using alternative protocols. Many arbitrate the next system bus is operation while the present operation is being executed (overlapping arbitration). Reflective memory systems must not begin overlapping arbitration cycles until one clock after inhibits occur, to allow time for the DRAM controller to respond with BR.

DRAC 50 uses the information in the programmable registers and in other related registers, and information from the system bus and DSRD's status information, to provide various control signals to its internal circuits and the DSRD. This allows DRAC 50 to efficiently support a particular system bus and processor system, and to provide support for different data transaction requirements. Control signals to DSRD and status responses from the DSRD pass through a FIFO/EDC Interface and I/O buffer circuit 128. These signals will be discussed below.

The DRAM control signals include RAS[3:0], CAS[3:0], and WR[3:0]. RAS[N] and CAS[N] are externally buffered and connected to all DRAM memory banks contained in Block [N]. Each of the write enable lines WR[M] are externally buffered and connected to Bank |M| in every occupied block.

The particular control architecture employed treats bit wide organized DRAMS and nibble-wide organized DRAMS identically. When bit-wide DRAMS are used, the data in and data out pins are tied together. When nibble-wide DRAMS are used their OE pins are always tied to ground (enabled). Both types of DRAMS are then written using the Early Write Cycle mode. This mode requires their R/W lines to be set at the appropriate levels before assertion of CAS.

The occurrence of the RAS and CAS signals with respect to the address, as well as their pulse widths (including precharge widths), can be programmed by setting the appropriate bits in a DRAM Timing Control Register. When MCLK runs at 100 MHz these values can be programmed to a resolution of 10 ns.

The RAS/CAS signals, and the address signals of the DRAC, are respectively sent into the RAS/CAS drivers and address drivers. The RAS[3:0] and CAS[3:0] are generated by RAS/CAS generation circuit 87 and comprise the memory's RAS and CAS timing pulses for all blocks. RAS[N] and CAS[N] are wired to all banks within Block N. The address signals can be formed into 12-bit multiplexed row/column address for the memory which can span 16 Mbits of the memory.

4. FEDC UNIT STRUCTURE

In accordance with the present invention, the data sending and receiving device (DSRD) of the memory controller preferably includes a plurality of data channels, each of which is a FIFO/error detection and correction circuit (FEDC).

FIG. 4 shows an embodiment of FEDC unit 30, constructed in accordance with the invention, which is part of the memory controller. FEDC unit 30 includes two groups of FIFO/error detection and correction logic arrays (FEDCs) to provide two 32-bit data channels. Two of these units can efficiently support either 32-bit or 64-bit system buses. FEDC 30 provides a read and a write data path. In this embodiment, FEDC 30 has a 32-bit data bus interfacing to the system bus and a 64-bit data bus which is subdivided into two complete 32-bit data paths interfacing to the DRAM. Each 32-bit data bus on the DRAM side is associated with seven error check bits. In accordance with the present invention, four FEDC units 30 can be connected to efficiently support 32-, 64- and 128-bit system buses.

FEDC unit 30 is coupled to the FIFO/EDC Interface and I/O circuit 128 of DRAC 50 through control buffer and decoder 175, output buffer 162 and DRAC DATA I/O BUFFER 250. FEDC unit 30 receives control signals from DRAC 50 and sends status signals back to DRAC 50 through the above-described interface paths.

These interface paths also provide a means for the FEDC 30 to program command registers 73 and timing register 74, and for reading status register 76 inside DRAC 50. For all transactions to and from DRAM memory, the DRAC 50 supplies encoded control signals to the FEDC 30. These control signals can specify write FIFO steering/channel selection, read channel selection, error correction, enable/disable FIFO clear command, and write error correction polynomial generation. Further, these control signals are conceptually divided into two distinct classes. One class of these control signals operates on the system bus side of the FEDC 30. The other class of these signals operates on the DRAM side of the FEDC 30 (i.e. on the outputs of FIFOs 145, 146, 147, 148 for write transactions and the inputs of the Data/Pipeline registers 177, 178, 179 and 180 on reads). FEDC unit 30 is also coupled between a system bus and the DRAM memory through input and output buffer arrays 130, 162, 168, 169, 170, 172, and 174, to send data to and receive data from the system bus, and to send data to and receive data from the DRAM under control of DRAC 50.

All data flow between the DSRD and the system data bus is assumed to be aligned with the bus width. When a system bus transaction crosses these aligned boundaries, the processor or cache controller will split the transaction into multiple operations and issue an address phase for each portion. Thus, these misaligned transactions cannot be bursts.

The memory controller stores data into memory on a predetermined memory boundary, depending on the memory structure. In the present embodiment, the memory alignment is 128-bits wide. Burst transactions of 4, 8, or 16 bytes are assumed to be aligned on a 16-byte boundary. In this case, the memory boundary is 128-bit wide data. Burst transactions mis-aligned to the storage boundary will involve 4-, 8-, or 12-byte transfers between the DSRD and main memory during the first cycle of the burst. The memory address will wrap around within the burst length as more data is transferred. The final data transfer will include the banks omitted during the first cycle of the memory transfer. The nature of the misalignment depends on the defined burst order, such as sequential or Intel.

In accordance with the present invention, FEDC unit 30 includes two groups of FEDC arrays which form two independent data write and read channels. Each channel has a 32-bit data width and can access one bank in the memory. The two channels or FEDCs in a FEDC unit 30 can access two banks simultaneously. All write data is steered to one of the two channels. The data path through one of the two channels is selected during the data phase by the control signals from DRAC 50, depending on the bus size and/or status of the two channels. During a burst write, the two channels can run in an alternating fashion so that all data can be accummulated for transfer into the DRAM.

Each FEDC or data channel includes a write first-in-first-out buffer (write FIFO) 145 or 147 for use during normal write transactions. As an advantage of the present invention, write FIFO 145 or 147 is also used for posted write transactions in which the data to be stored is posted in write FIFO 145 or 147. This function is achieved due to the split configuration of the address/control path in DRAC 50.

Each FEDC is further provided with a reflective read first-in-first-out buffer (reflective FIFO) 146 or 148 for exclusive use during reflective read transactions, in which a coherent read and a copyback for updating the main memory occur simultaneously. Each FIFO can have a 32-byte depth to support data bursts in different lengths. Bus burst operations are supported up to the full write FIFO depth. Under this configuration FEDC unit 30, in cooperation with the split configuration of the address/control paths of DRAC 50 as discussed above, allows posted write transactions, reflective read transactions, and supports various MBus Level 1 and Level 2 transaction types.

To abort a write and convert the write to a read for ownership operation in multiprocessing environments, write FIFOs 145 and 147 are cleared to prepare for the next write cycle. DRAC 50 issues a special command to FEDC device 30 to clear FIFO 145 and 147 when writes are inhibited.

Certain control signals CST are also stored in FIFOs 145–148. These signals include parity status, bank write status and burst last status. During writes, these status bits and the FIFO status (FEST) are reported by FEDC unit 30 through output buffer 162 to DRAC 50 during every data phase clock cycle. DRAC 50 uses this status information to complete the write transaction.

During write transactions, system bus data is stored in system bus pipeline register circuit 136 inside FEDC unit 30 before being transferred into the appropriate write FIFOs. Byte wide parity is computed on the data by parity checking logic 140 as it flows from register circuit 136 into the FIFO. This is optionally checked against the bus parity which is applied simultaneously with data over the system bus into FEDC unit 30 through input and output buffer 174. A bus parity mode signal (PMD) is supplied from the system bus to determine the parity mode. The parity computation is qualified by the system bus byte enables. If a data bus parity error occurs, a bus error signal (BERR) is asserted.

The data from FIFOs 145/147 or 146/148 and output register circuits 193/194, and all zeros used to initialize the memory check bits, flow into data multiplexer circuit 156 or 157 which are multiplexed under control of DRAC 50. The selected data signals flow into write polynomial generation circuits (WPG) 164 or 166 which generate seven additional bits for use by the error correction circuitry. If each FEDC or channel is arranged to handle 32-bit wide data, the width of a single word emerging from a channel through input and output buffers 168/169 or 170/172 will be 39 bits.

The FEDC unit 30, in accordance with the present invention, can support various data transactions having different data lengths, which include byte transactions which are less than the data bit width of a bank of the memory. Also included are multiple word transactions within the memory boundary (sub-burst transaction which are less than the data width of a block of the memory), multiple word transactions which are the same as the data bit width of a block of the memory, and multiple word transactions which exceed the data bit width of a block of the memory.

Byte enable signals from control signal buffer 175 are respectively sent to registers 149–152. These enable signals are then sent to multiplexer circuits 156 and 157 for byte(s) selection.

During a write having less than the data width of a bank in a block of the memory, DRAC 50 executes a read-modify-write cycle. The data is first read from a bank of the memory through input and output buffer 168 or 170 and pipelined through pipeline register circuit 179 or 180. Then, the read-out data passes through error detection and correction circuit (EDC) 185 or 188 into data out register circuit 193 or 194. EDCs 185 or 188 detect and correct the errors of the read-out data during the read modified-write cycle. The data bytes to be stored, which are buffered in a write or reflective FIFO, are combined with the old read-out data from register circuit 193 or 194 under control of the byte select signals in data multiplexer circuit 156 or 157. The combined write data then flows into write polynomial generation circuit (WPG) 164 which generates new check bits. The modified single word is fin ally written into the memory under control of appropriate control signals from DRAC 50. Whenever an error occurs in the read-out data, the detected error information will be saved in a read error log FIFO (log FIFO) 200 or 201. The error information can be used to determine which bit was defective.

During writes of a data sub-burst, the data passes into FEDC unit 30 where WPG 164 or 166 appends check bits to the data. A single block in the memory is created, but, not all of the extra long word is written. Only the write strobes and data output enables for the words in the original sub-burst are asserted. CAS is asserted for the entire selected block. The data is written into the appropriate portions of the selected block using an early write cycle. The portions of the block that are not updated (for which write is not asserted) undergo a dummy read operation. This dummy data is discarded.

For a burst of length equal to the block data bit width, the data words are sequentially pipelined over the data bus and demultiplexed by FEDC unit 30. All write strobes are asserted simultaneously updating all bits in a block bandwidth with an early write cycle.

When the burst length exceeds the memory boundary, the accessed block's RAS|x| (where x=0, 1, 2 or 3) is maintained low and sequential reassertions of CAS|x| (where x=0, 1, 2, or 3) occur which results in the writing of multiple memory pages (in other words, a DRAM page mode-type access occurs). In this transaction, the address may be misaligned to the memory page boundary. When this occurs, data appearing simultaneously at write FIFO 145–148 may not be destined for the same memory page. Write strobes emanating from FEDC unit 30 are associated with each bank. The write strobes and FIFO status are selectively enabled, and the write FIFO selectively unclocked, by control signals originating inside DRAC 50. This essentially realigns the central portion of long bursts to a memory data boundary. The final memory page's write strobes, FIFO status and FIFO unclocks are also selectively enabled, completing the storage of the remainder of misaligned data into main memory. If a FIFO empty condition occurs in the middle of a burst write, DRAC 50 waits for more FIFO data to finish the burst into main memory. When DRAC 50 receives a burst-last indication, the transaction is immediately terminated after completing the current cycle, regardless of the burst length that was specified by the SIZE bits during the address phase.

Should a system bus data parity error occur in the middle of a burst, any data inside write FIFO 145–148 from portions of burst transfer that preceded the parity error will be stored in main memory. The data containing the parity error is ignored on a block basis. In other words, whenever one or more bytes within a block contains a parity error, the entire word with the block width is discarded. After discarding the word that contains a parity error, FIFOs 145–158 may still contain valid data from the portion of the burst transaction that occurred subsequent to the discarded block. This remaining data is stored successfully. An interrupt will be generated and the appropriate status bit set (assuming that data parity error interrupts are enabled) indicating that a parity error has propagated through write FIFOs 145–148. This error will already have resulted previously during a BERR assertion.

During read operations, all bits of the accessed block are read simultaneously. All the bits are strobed in parallel into data pipeline register circuits 179 and 180. The data in the two channels simultaneously flows through EDCs 185 and 188 for error detection and correction, and to data out register circuits 193 and 194. The corrected or uncorrected data in each channel are selected by respective multiplexers 195 and 196. The appropriate data is then selected by data out multiplexer circuit 206 and supplied to the system bus via input and output buffer 130. Byte-wide parity is appended to the data by parity generation circuit 176 as it exits FEDC unit 30 through input and output buffer 174. Under normal conditions, the data will not require correction and is presented via data out multiplexer 206 to the system bus. When the data requires correction, the system bus acknowledge, along with all remaining data in the burst, is delayed by one clock cycle. Even when multiple words within a burst contain a single bit error, incorrect data will not reach the system bus.

The misalignment of a read data burst exceeding a main memory data boundary is fully supported as with writes. Such misaligned transactions will begin with a full memory block read. Only a fraction of that block will be sent over the data bus. The memory access will continue with one or more additional complete blocks being transferred over the system bus. The final access of the burst will return to the original block where one or more untransferred data banks remain. When the burst line length exceeds the bandwidth of main memory, the DRAC 50 maintains the selected block's RAS |x| and reasserts CAS|x| to read the next block (a page mode-type access occurs).

Whenever an error occurs during system access or scrubbing, the detected error information will be logged in read error log or Syn FIFOs 200 and 201. The error information can be used to determine which bit was defective. Syn FIFOs 200 and 201 are designed to store the results of the longest burst transfers defined for the bus. Syn FIFOs 200 and 201 can fill up due to consecutive errors in the longest defined bus burst. When this occurs, further errors will not be logged. Syn FIFOs 200 and 201 are only intended to capture errors from a single burst. Prior to the next burst, they should be cleared by the host processor.

Status multiplexer 160 is provided to multiplex the status bits from the write and reflective read FIFOS and from error detection circuits 186/190. The multiplexed signals will be sent to DRAC 50 through output buffer 162.

Figure 5:
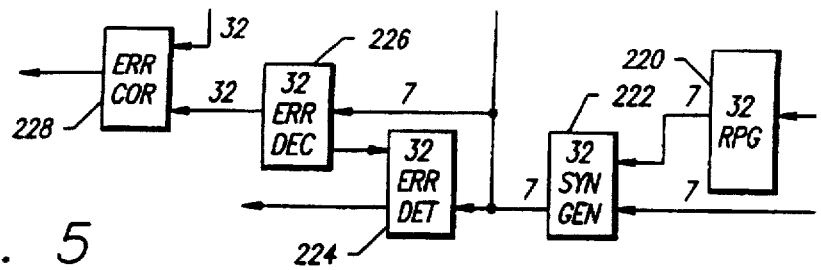
FIG. 5 shows a block diagram of an embodiment of an error detection and correction device (EDC) used in the data sending and receiving circuitry of the memory controller constructed in accordance with the present invention.

FIG. 5 shows an embodiment of an EDC circuit 185 or 188. EDC 185 or 188 includes read polynomial generator (READ POLY GEN) 220 used to latch the read-out data (i.e. R/O Data) and to produce check bits. Syndrome generator 222 compares the check bits from main memory (i.e. R/O Check Bits) with those generated by READ POLY GEN 220. If the two sets of check bits are identical, no errors have occurred in the data. Should the comparison show a difference in the two sets of check signals, error detector 224 decodes the syndrome, identifying the type of error. The appropriate error status bits identifying the type of error are reported to DRAC 50 through status MUX 160 and the FEST signals of OUTBUF 162. An interrupt is also generated to the processor by DRAC 50 in response to the FEST error status signals. Simultaneously, error position decoder 226 receives the signal from the syndrome generator 222 to create a 32 bit word that identifies the bit position of the error. Error position decoder 226 also returns a signal (i.e. UNCOR) to error detector 224 to distinguish between single-bit and uncorrectable errors. Inside error corrector 228, these decoded 32-bits are exclusive-OR'd with 32-bit R/O Data to invert the defective bit position. When an error occurs, the error information from the syndrome generator 222 is sent to Syn FIFO's 200 or 201.

In accordance with the present invention, FEDC unit 30 can be made into an integrated circuit (IC). Multiple IC's can be arranged in parallel to form a FEDC device or DSRD to support system buses having a wide bus bandwidth and with narrower bandwidth.

It should be understood that the particular configuration of two channels in FEDC unit 30 is only an example to show the present invention's principles. FEDC unit 30 may also be constructed in only one channel or multiple channels. In addition, each channel in FEDC unit 30 may also have a different data bit handling ability, as discussed below.

5. COMBINATION OF FEDC UNITS

One important feature of the present invention is that the DSRD of the memory controller includes a plurality of FEDC units 30 or data channels which can be easily set up to efficiently support different bus sizes and processor systems and efficiently utilize memory sources. This is achieved by combining two or more FEDC unit 30 chips to form an FEDC device.

During the address phase, DRAC 50 interprets the address/control information and selects the appropriate channel and FIFOs inside each FEDC unit 30 during every cycle of the data phase. Channel selection depends on the length of the burst, the burst order, and the system bus size. When a write transaction is a data burst, the channels in each FEDC unit 30 are clocked in an alternating fashion. That is, one channel inside each FEDC unit 30 is selected on the first cycle of the data phase and the other channel is selected on the next cycle of the data phase. This process continues demultiplexing and storing data from the incoming system bus until 128 data bits are accumulated or the burst is terminated. This data is then transfered to DRAM 50. When the INH signal is asserted during a reflective memory transaction, the data is routed into the appropriate reflective FIFOs.

During a system bus read transaction, 4×32 bits of data and 4×7 check bits (156 bits in all) are read in parallel from DRAM 50. Each channel handles 32 bits of data.

Figure 6C:
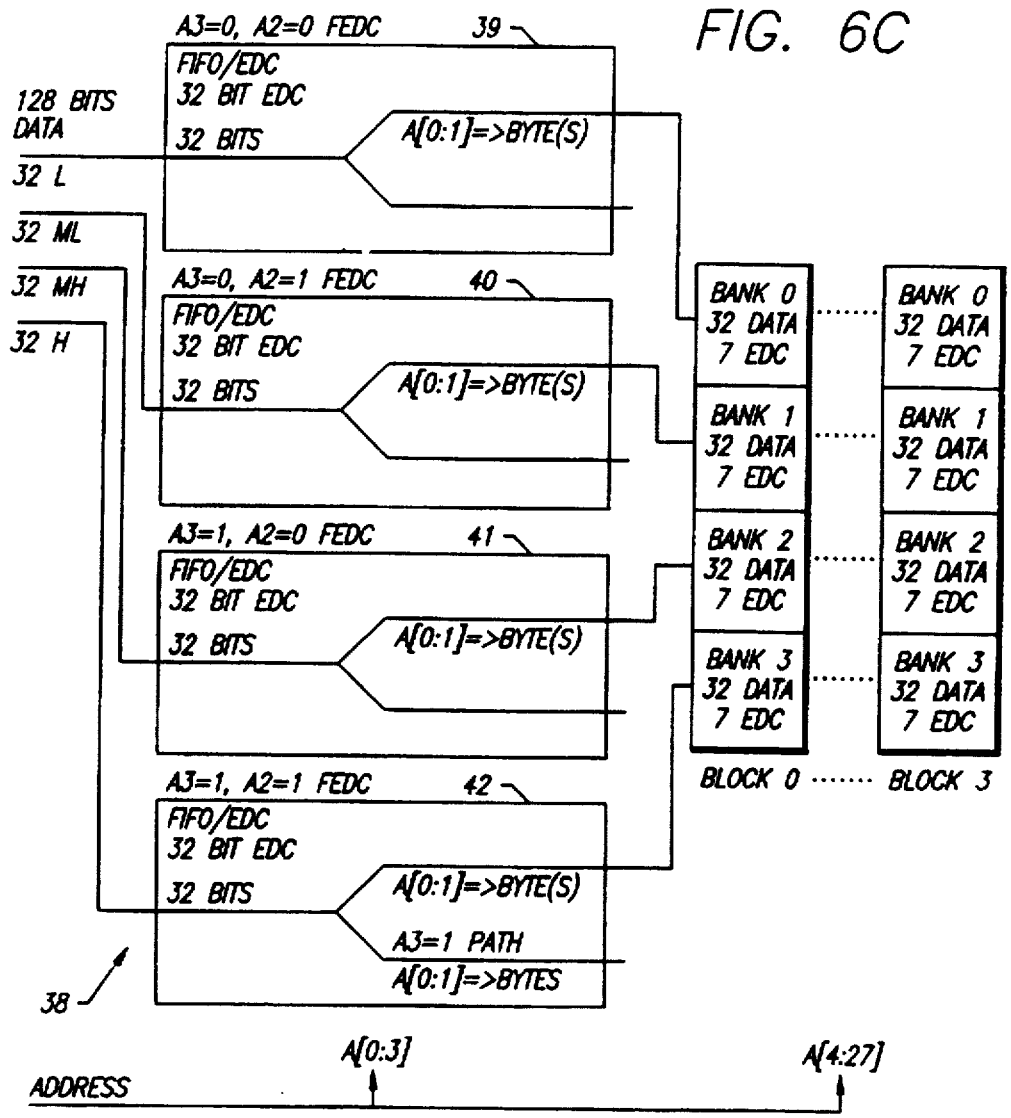
FIGS. 6A–6E show various embodiments employing arrangements of the data sending and receiving circuitry to efficiently support system buses which have different bus sizes and data transactions which have different data sizes.
Figure 6A:
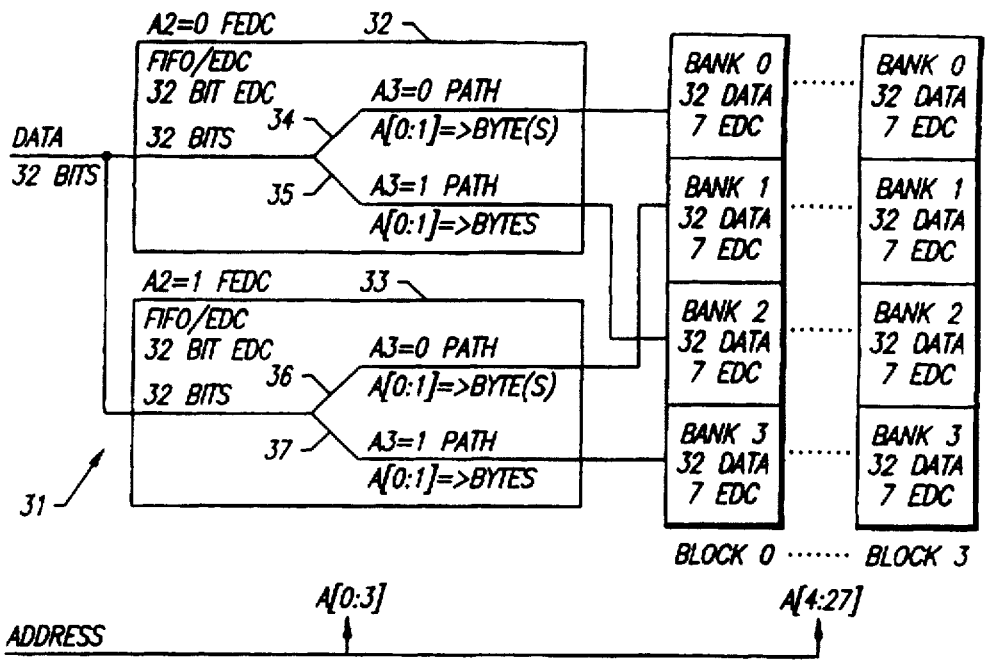
Figure 6B:
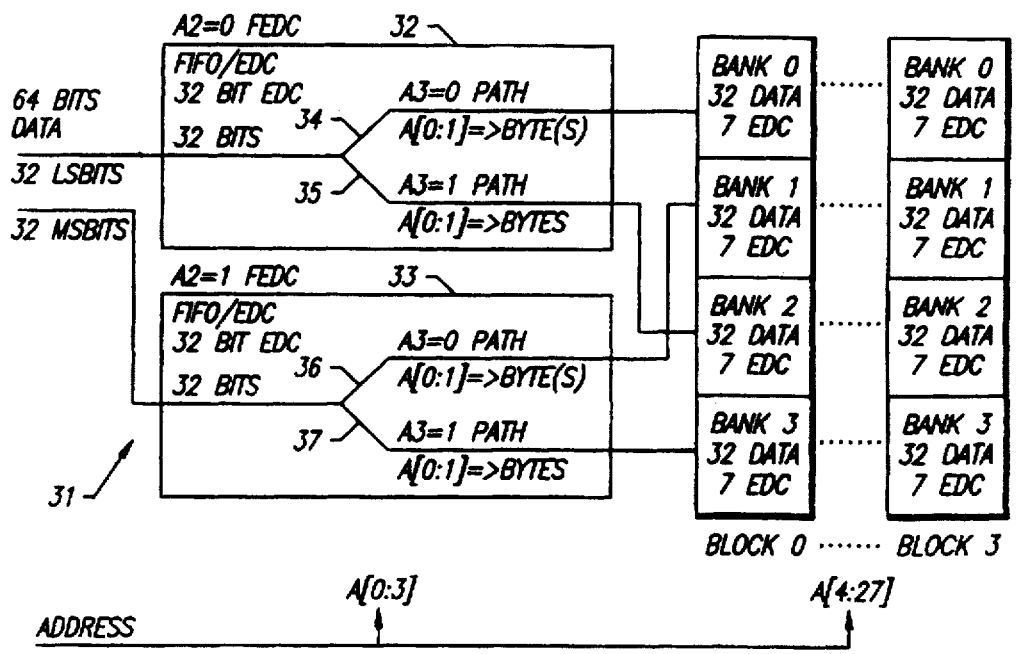

FIGS. 6A and 6B show an embodiment of FEDC device 31 which can efficiently support 32- or 64-bit system buses. FEDC device 31 includes two FEDC units 32 and 33, each of which have two FEDC channels 34-35 and 36-37. Each channel can handle 32-bit data and can access one bank in a selected block 12 of main memory 10. An example of the connection from FEDC device 31 to blocks 1-4 of main memory is illustrated.

A portion of an address signal from write and read burst counters 114 and 116 is used to identify an FEDC unit and channel number, to allow the data channel to access the proper bank or banks in data transactions which have different data lengths. DRAC 50 provides selection signals to select the proper FEDC units and proper FEDC channels. The lower bits A[3:0] in the address signal and their identification functions for a 32-bit system bus and a 64-bit system bus are, respectively, listed in Tables 28 and 29.

TABLE 28

| DRAM BRST | DRAM ADDRESS | BANK# | | | |
|---|---|---|---|---|---|
| ADDRESS BUS BRST | A[27:4] | A3 CH# | A2 FEDC | A1 | A0 BYTE |

TABLE 29

| DRAM BRST | DRAM ADDRESS | BANK# | | | |
|---|---|---|---|---|---|
| ADDRESS BUS BRST | A[27:4] | A3 CH# | A2 FEDC(A2) (A[2:0]) | A1 BYTE | A0 |

For 32- and 64-bit system buses, A2=0 identifies FEDC unit 32 and A2=1 identifies FEDC unit 33. A3=0 identifies channels 34 and 36, and A3=1 identifies channels 35 and 37. In a 32-bit bus system, during system bus transactions of 32 bits or larger, A[1:0] will be ignored to allow all bytes to be enabled. In a 64-bit bus system, during system bus transactions of 64 bits or larger, A[2:0] is ignored and all bytes are enabled.

FIG. 6C shows FEDC device 38 which includes four FEDC units 39-42 to support a 128 bit system bus. Each FEDC unit can handle 32 bits of data. Identification functions of A[3:0] are listed in Table 30.

TABLE 30

| DRAM BRST | DRAM ADDRESS | BANK# | | | |
|---|---|---|---|---|---|
| ADDRESS BUS BRST | A[27:4] | A3 FEDC PAIR | A2 | A1 BYTE | A0 |

In this embodiment, combination of A2 and A3 is used to select one of FEDC units 39-42. A3=0 and A2=0 identifies FEDC unit 39. A3=0 and A2=1 identifies FEDC unit 40. A3=1 and A2=0 identifies FEDC unit 41. A3=1 and A2=1 identifies FEDC unit 42. During system bus transactions of 128 bits or larger, A[3:0] is ignored and all bytes are enabled.

Figure 6D:
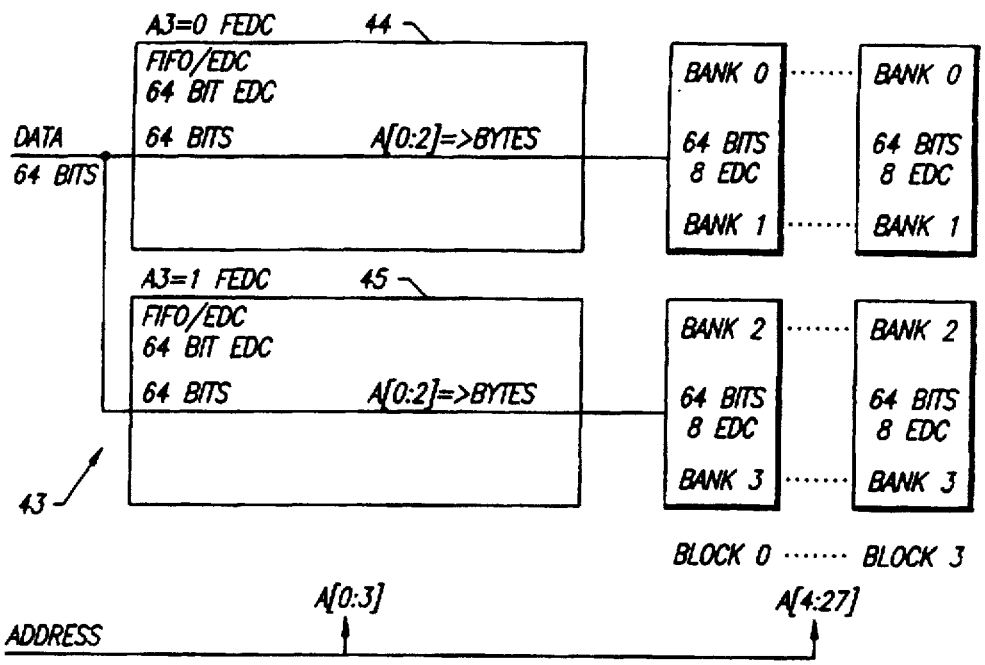
Figure 6E:
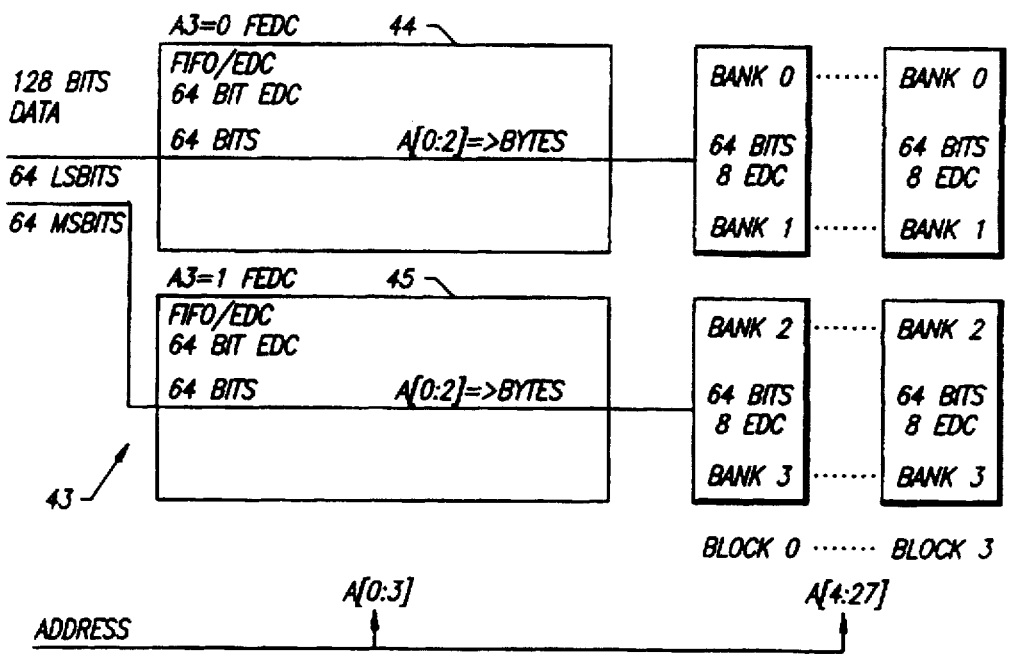

FIGS. 6D and 6E show another embodiment of an FEDC device 43 which includes two FEDC units 44 and 45 to support a 64- or 128-bit system or smaller system buses. In this embodiment, each FEDC unit 44 or 45 includes only one FEDC or one FEDC channel which can handle 64 bit data. A3=0 identifies FEDC unit 44, while A3=1 identifies FEDC unit 45. For a 64 bit system as shown in FIG. 6D, during system transactions of 64 bits or larger A[2:0] are ignored, and all bytes are enabled. For a 128 bit system bus as shown in FIG. 6E, during system transactions of 128 bits or larger A[3:0] are ignored, and all bytes are enabled.

6. MULTI-PROCESSING SUPPORT

The DRAM Controller has complete support for multi-processing environments. Read operations are inhibited by the assertion of INH when a snooping cache supplies data to a requesting cache. When the TRC input is asserted, these reads are considered reflective and the data transferred over the bus is captured by the Reflective Write FIFO. The incoming BACK signal will be used by DRAC 50 to create FEDS for the FEDC to strobe data into the Reflective Write FIFO. The BR signal will be asserted by the DRAM controller until the data is written into the DRAM. This signal can be used to disable further reads (which could be reflective until the Reflective Write FIFO is empty). This disabling could occur in one of two ways. Either the BR signal could make the highest priority request of the multi-processing bus arbitration logic keep other hosts off the bus until the transfer is completed, or the snooping cache might have a mechanism to slow down bus transfers (e.g. its own data strobe).

During write cycles the INH signal can be used to abort writes by changing them to a read for ownership. When no snooping cache reports a hit on the requested line, the system will assert TRC and the DRAM will convert the aborted write to a read.

The DRAM controller architecture requires that all processors in a multi-processor system have the same status on a cache line stored in main memory. No provision is made to merge data that results from a write through operation (non-cacheable) from processor A, with a modified line (cacheable) from snooping processor B's cache.

INH and TRC arrive at the DRAM controller before data is transferred to/from memory if the transfer is to be successfully inhibited. The positions of the data strobe controlling the memory transfer can be programmed along with the rest of the DRAM timings. Alternatively the transfer can be positioned by extending the SNW input (snoop window). Systems not requiring a snoop window can permanently de-assert the SNW signal.

7. COOPERATION BETWEEN THE DRAC and FEDC DEVICES During a data transaction, DRAC 50, and especially the status and timing control logic 72 of DRAC 50, generates a number of encoded control signals to FEDC 30 via FIFO/EDC Interface and I/O circuit 128. These control signals are discussed in the following paragraphs.

After recognizing a memory operation during the address phase of a transaction, DRAC 50 interprets the command and forwards control information to FEDC 30 through FIFO/EDC Interface and I/O circuit 128. During the data phase, these control signals are updated by DRAC 50 and FEDC 30 responds with a status signal to DRAC 50 through OUTBUF 162. DRAC 50 in turn, responds over the system bus with a composite acknowledge signal.

For example, the encoded control signals generated by DRAC 50 include FIFO transaction strobe signals (FEDS), FEDC address or chip selection signals (FECS) which select one or more FEDCs for participation in the operation, and FEDC address signals (FEA) for selecting one of the two FEDCs in a FEDC unit or I/O path. Additional signals include FEDC transaction type signals (FET), FEDC byte enable signals (FEBE), and DRAM cycle type signals (FEDRT). Finally, DRAC 50 generates long burst strobe enable signals (FESTEN), FEDC read strobe signals (FESTRB), and I/O data enable signals (IODTA).

FEDS serves as the data strobe during all transactions into FEDC's FIFOS.

FECS is used to select and enable individual FEDC units. It selects one or more FEDCs for participation in a data transaction.

FEA is used with FET to define the particular bus transaction. During memory accesses, FEA selects an FEDC within each FEDC unit. On memory writes, FEA selects the appropriate channel or channels depending on the data length and the bus size. On memory reads FEA enables the correct data word onto the system bus.

For example, during write of a long burst, FEA selects one channel in each FEDC unit to accumulate the burst data on a memory boundary, and then selects the other channel in each unit to accumulate the following burst data. The channels in each FEDC unit run in an alternating fashion so that burst data can be efficiently stored into memory.

FET specifies the nature of the transaction in conjunction with FEA. For example, during DRAM read/write operations, FET defines bus transaction types which may include read data, write data, reflective write, clear write FIFOs. During system bus I/O operations, FET bits ared used to control the I/O data path from DRAC 50 to FEDC 30. These bits also control reading of I/O registers in DRAC 50, and reading of syndrome and check bits in FEDC 30, along with the reading of MBus port registers in FEDC 30.

FEBE bits are interpreted as versions of the transaction size. FEBE bits are distributed among the multiple FEDCs, and reflect the individual bus byte enables programmed with the SIZE bits as well as the transaction's length. These signals are decoded so that they are identical to the SIZE bits.

FEDCT is used to identify the appropriate memory cycles which include write EDC check bits, write with EDC, INIT DRAM and check bits, reflective write with EDC, read uncorrected path read corrected path read syndrome FIFOs.

FESTEN bits are used to support memory burst transfers that cross 128-bit boundaries. This signal is used to qualify FESTRB and to validate the status bits returned by the memory on a 32-bit basis.

FESTRB acts as the read data strobe during memory read operations and the FIFO unclock signal during memory write operations. It is used to store data in FEDC read data pipeline registers 177–180. During writes this signal is asserted by DRAC 50 to access the next data from the appropriate write FIFO.

IODTA bits carry the data between FEDC 30 and the registers inside DRAC 50. They are only used during I/O operations. During memory operations they are disabled.

FEDC unit 30 also generates signals (FEST) back to DRAC 50 to inform it of the status of transactions. Each FEDC unit 30 provides its FEST bits to DRAC 50. All FEDC units have their respective FEST signals interconnected at the DRAC inputs. In an embodiment, the status information includes uncorrectable data error (UNC), two bit data error (DBIT), single bit data error (SBIT), syndrome FIFO empty (EFE), and syndrome FIFO full (EFF). Additional signals include current FIFO data being the last transfer in a prematurely terminated burst (BLST), data parity error (DPE), data FIFO channel 0 being now empty (DFE0), data FIFO channel 1 being now empty (DFE1), reflective data FIFO channel 0 being now empty (RFE0), reflective data FIFO channel 1 being empty (RFE1). These signals are associated with the different memory cycles.

8. REFRESH OPERATION

Refresh requirements vary depending on the density and organization of the DRAM chips in the system. However, rows must be refreshed (in this case a read operation followed by scrubbing) at the same time interval (approximately every 16 µs). The refresh requests are generated by two cascaded counters (timers) which are a part of refresh control circuit 83 of DRAC 50 (FIG. 3). A programmable 7-bit counter divides CLK down to create a 1 MHz clock signal. This clock is further divided by a 4 bit, modulo 15 counter, to generate a refresh request every 15 usec. These refresh requests are synchronously arbitrated with memory requests by a refresh status control circuit in refresh control circuit 83. System bus requests will receive priority over a refresh request, however, the refresh will be inserted before another bus request can occur.

A Refresh/Initialization Address Counter is a part of refresh control circuit 83 of DRAC 50 (FIG. 3), which is connected to address source multiplexer 121. This counter is advanced by one row every refresh request. The column address forms the next most significant portion of the refresh address. After all rows are refreshed and scrubbed at the same column address, the column count advances and all rows are then refreshed at the next column address. The row and column address counters are each 12 bits long spanning 16 Mbits.

All four banks of a given block are scrubbed (i.e. checked for for single-bit errors and corrected if necessary) simultaneously at a particular address. The four error correction channels in FEDC 50 are used in parallel. While one of the four DRAM blocks is scrubbed, the other 3 blocks undergo normal refresh. A 2-bit Scrub Block Counter advances after all rows and columns in a particular block are refreshed so that the next block can be scrubbed. When an error is detected during scrubbing, the correction address will be copied from the Refresh Address Counter to an Error Location Register. During read operations data is always corrected at the system bus (providing EDC is enabled). When an error occurs the corrected data is not written back into the memory array. Data is corrected inside the DRAMs during scrubbing cycles only. When an error occurs during a refresh cycle (i.e. a read to check for errors), the refresh cycle is turned into a scrub cycle (i.e. Read Modify Write to correct the errors).

Each block of memory may be populated with different sized DRAM components, however, all banks within a given block must be populated with the same size device. For simplicity, the Refresh Address Counter treats every block as if it were populated with DRAMS of maximum (16 Mbit)

capacity. When refreshing smaller memories, the same address location will be scrubbed multiple times before the counter advances to the next location. The scrub repetition count can be expressed as $$R=2^{(12-M)}$$

Where R is the repetition count in this expression and M is the $\log_2$ of the square root of the smaller memory's size.

While the preferred embodiments of the present invention have been shown and described, it will be apparent to those skilled in the art that many more modifications are possible without departing from the spirit and scope of the invention. For example, the memory may be configured with a different number of blocks. The memory system or principles can also be used with system buses other than MBus. FEDC 30 can be constructed with a different number of channels and the channel data width may also vary depending on system requirements.

What is claimed is:

1. A memory system coupled to a system bus, said memory system comprising:
   a memory including at least one block, said at least one block including a plurality of banks;
   a plurality of data channels, each of said data channels coupling a plurality of data bits between said system bus and at least one of said plurality of banks; and
   a controller coupled to said system bus and to said plurality of data channels for receiving address and control signals from said system bus and for controlling the transfer of data between said memory and said system bus in response to one or more addresses specified by said address and control signals, said controller selecting a number of said plurality of data channels for transferring said data between said system bus and said memory based on said addresses, the number of data channels selected depending on the size of said system bus.

2. A memory system as in claim 1 wherein at least two of said plurality of banks are accessed during alternating cycles of a burst-type write transaction.

3. A memory system as in claim 1 wherein said system bus comprises an MBus coupled to a plurality of processors and each of said plurality of processors is coupled to at least one data cache, no two of said plurality of processors being associated with the same data cache.

4. A memory system as in claim 1 wherein said plurality of data bits numbers $2^n$, where n is 5, 6 or 7; and each of said plurality of data channels is coupled to to a different one of said plurality of banks.

5. A memory system as in claim 1 wherein:
   at least one of said plurality of data channels is included within a first-in-first-out error detection and correction (FEDC) unit;
   said FEDC unit is selected by a first one or more bits of said addresses;
   said at least one of said plurality of data channels is selected by a second one or more bits of said addresses; and
   at least one of said plurality of banks is accessed through the selected data channel of the selected FEDC unit.

6. A memory system as in claim 1 wherein each of said plurality of data channels comprises an error detection and correction (EDC) circuit.

7. A memory system as in claim 6 wherein each of said data channels transfers up to 32 bits of data between said system bus and said memory and each of said EDC circuits generates 7 EDC bits for each transfer of data between said system bus and said memory through the data channel of which it is a part.

8. A method of transferring data between a system bus and a memory comprising the steps of:
   selecting one or more of a plurality of data channels coupled between said system bus and said memory based on addresses on said system bus, each of said plurality of data channels coupled to at least one of a plurality of banks of said memory, the number of said plurality of data channels selected depending upon the size of said system bus; and
   transferring data comprising a plurality of data bits between said system bus and said memory over the one or more selected data channels.

9. The method of claim 8 wherein said step of transferring data between said system bus and said memory includes storing said data in one or more first-in-first-out buffers.

10. The method of claim 8 wherein said plurality of data bits numbers $2^n$ where n is 5, 6 or 7 and each one of said data channels transfers data bits between a different one of said plurality of banks of said memory and said system bus.

11. The method of claim 8 wherein said plurality of data bits numbers $2^n$; n is 5, 6 or 7; at least a first one of the plurality of data channels is included within a first first-in-first-out error detection and correction (FEDC) unit and at least a second one of the plurality of data channels is included within a second FEDC unit; and wherein said step of selecting one or more of said plurality of data channels comprises the steps of:
   providing each data channel of the first FEDC unit with $2^{n-1}$ least significant bits of said plurality of data bits;
   providing each data channel of the second FEDC unit with $2^{n-1}$ most significant bits of said plurality of data bits; and
   coupling each of said plurality of data channels to a different one of said plurality of banks such that at least one data channel of said first FEDC unit is coupled to even-numbered banks, and at least one data channel of said second FEDC unit is coupled to odd-numbered banks.

12. The method of claim 8 wherein said plurality of data bits numbers $2^n$; n is 5, 6 or 7; a first two of the plurality of data channels are included within a first first-in-first-out error detection and correction (FEDC) unit, a second two of the plurality of data channels are included within a second FEDC unit, a third two of the plurality of data channels are included within a third FEDC unit and a fourth two of the plurality of data channels are included within a fourth FEDC unit; and wherein said step of selecting one or more of said plurality of data channels comprises the steps of:
   providing each of said two data channels of the first FEDC unit with $2^{-2}$ low (L) significant bits of said plurality of data bits;
   providing each of the two data channels of the second FEDC unit with $2^{n-2}$ mid-low (ML) significant bits of said plurality of data bits;
   providing each of said two data channels of said third FEDC unit with $2^{n-2}$ mid-high (MH) significant bits of said plurality of data bits;
   providing each of said two data channels of said fourth FEDC unit with $2^{n-2}$ high (H) significant bits of said plurality of data bits; and
   coupling a first one of the two data channels of each of said FEDC units to a different one of the plurality of banks such that the first FEDC unit is coupled to a first bank, the second FEDC unit is coupled to a second bank, the third FEDC unit is coupled to a third bank and the fourth FEDC unit is coupled to a fourth bank, said first, second, third and fourth banks being physically adjacent to one another.

13. The method of claim 8 wherein said plurality of data bits numbers $2^n$; n is equal to 7; numbering two a first two of the plurality of data channels are included within a first first-in-first-out error detection and correction (FEDC) unit and a second two of the plurality of data channels are included within a second FEDC unit; and wherein said step of providing a selecting one or more of said data channels comprises the steps of:

providing each of the two data channels of the first FEDC unit with $^{n-1}$ least significant bits of said plurality of data bits;

providing each of the two data channels of the second FEDC unit with $2^{n-1}$ most significant bits of said plurality of data bits; and coupling the two data channels of each of the first and second FEDC units to a different adjacent two of said pluarality of banks such that the first FEDC unit is coupled to a first and second adjacent bank and the second FEDC unit is coupled to a third and fourth adjacent bank.

14. The method of claim 8 wherein said step of transferring comprises the steps of:

generating error detection and correction bits for each transfer of data through the selected one or more of said plurality of data channels; and either storing said error detection and correction bits along with the transferred data when the transfer is a memory write, or retrieving said error detection and correction bits stored with the data when the transfer is a memory read.

15. The method of claim 8 wherein at least one of the plurality of data channels is included within a first-in-first-out error detection and correction (FEDC) unit, and wherein said step of selecting one or more of said plurality of data channels comprises the steps of:

selecting the FEDC unit in accordance with a first one or more bits of said addresses; and selecting one or more of the data channels of the FEDC unit in accordance with a second one or more bits of said addresses.

16. The method of claim 15 wherein said plurality of data bits numbers $2^n$, where n is 5, 6 or 7; and wherein said step of selecting one or more of the data channels comprises the steps of: providing each of the data channels of the FEDC unit with said $2^n$ data bits; and coupling each of said plurality of data channels to a different one of said plurality of banks.

* * * * *